US011569910B1

(12) United States Patent
Behroozi

(10) Patent No.: US 11,569,910 B1
(45) Date of Patent: *Jan. 31, 2023

(54) COMMUNICATIONS SYSTEM THAT PROVIDES CONTINUOUS SERVICE

(71) Applicant: SoftBank Corp., Minato-Ku (JP)

(72) Inventor: Cyrus Behroozi, Mountain View, CA (US)

(73) Assignee: Softbank Corp.

( * ) Notice: Subject to any disclaimer, the term of this patent is extended or adjusted under 35 U.S.C. 154(b) by 558 days.

This patent is subject to a terminal disclaimer.

(21) Appl. No.: 16/734,920

(22) Filed: Jan. 6, 2020

Related U.S. Application Data

(63) Continuation of application No. 14/132,300, filed on Dec. 18, 2013, now Pat. No. 10,615,873.

(51) Int. Cl.
*H04B 10/118* (2013.01)
*H04B 7/185* (2006.01)
*H04B 10/11* (2013.01)
*H04B 10/112* (2013.01)

(52) U.S. Cl.
CPC ....... *H04B 10/118* (2013.01); *H04B 7/18504* (2013.01); *H04B 10/11* (2013.01); *H04B 10/112* (2013.01)

(58) Field of Classification Search
None
See application file for complete search history.

(56) References Cited

U.S. PATENT DOCUMENTS

| 5,867,294 A | 2/1999 | Sakai |
| 5,946,120 A * | 8/1999 | Chen ............ H04B 10/11 398/154 |

(Continued)

FOREIGN PATENT DOCUMENTS

| WO | WO-0152450 A2 * | 7/2001 | ......... H04B 10/1123 |
| WO | WO-0152453 A1 * | 7/2001 | ............... B64B 1/50 |

OTHER PUBLICATIONS

Nadeem et al., Comparison of link selection algorithms for free space optics/radio frequency hybrid network, 2011 (Year: 2011).*

(Continued)

*Primary Examiner* — Jai M Lee
(74) *Attorney, Agent, or Firm* — Botos Churchill IP Law

(57) ABSTRACT

Aspects of the technology include establishing a primary communication link between a communication system of a first balloon and a communication system of a second balloon, detecting a movement of the second balloon relative to the first balloon that is expected to cause the primary communication link to become unavailable at a given time during the movement, establishing an RF communication link between an RF communication system of the first balloon and an RF communication system of the second balloon, detecting that the movement of the second balloon relative to the first balloon is such that the primary communication link between the communication system of the first balloon and the optical communication system of the second balloon can be re-established, and re-establishing the primary communication link between the communication system of the first balloon and the communication system of the second balloon.

11 Claims, 21 Drawing Sheets

(56) References Cited

U.S. PATENT DOCUMENTS

| | | | | |
|---|---|---|---|---|
| 6,590,685 | B1* | 7/2003 | Mendenhall | G01S 3/786 |
| | | | | 398/131 |
| 6,763,195 | B1* | 7/2004 | Willebrand | H04B 10/114 |
| | | | | 398/19 |
| 6,842,439 | B2 | 1/2005 | Zeitfuss | |
| 6,978,093 | B2 | 12/2005 | Clark | |
| 7,046,934 | B2 | 5/2006 | Badesha et al. | |
| 7,095,957 | B1* | 8/2006 | Britz | H04B 10/1123 |
| | | | | 398/118 |
| 7,110,678 | B2 | 9/2006 | Willebrand et al. | |
| 7,424,225 | B1* | 9/2008 | Elliott | H04B 7/18504 |
| | | | | 398/118 |
| 7,567,779 | B2* | 7/2009 | Seligsohn | B64B 1/44 |
| | | | | 455/12.1 |
| 7,609,972 | B2* | 10/2009 | Cunningham | H04B 10/1127 |
| | | | | 398/118 |
| 7,844,218 | B2* | 11/2010 | Seligsohn | H04B 7/18504 |
| | | | | 370/316 |
| 8,116,632 | B2 | 2/2012 | Miniscalco et al. | |
| 8,374,645 | B2* | 2/2013 | Elliott | H04L 1/06 |
| | | | | 455/552.1 |
| 8,718,477 | B2 | 5/2014 | Devaul et al. | |
| 9,270,372 | B2 | 2/2016 | Miniscalco | |
| 9,369,198 | B2 | 6/2016 | Beals et al. | |
| 9,503,176 | B2 | 11/2016 | Beals et al. | |
| 10,615,873 | B1 | 4/2020 | Behroozi | |
| 2001/0043381 | A1* | 11/2001 | Green | H04B 10/2587 |
| | | | | 398/126 |
| 2002/0122230 | A1* | 9/2002 | Izadpanah | H04B 10/1121 |
| | | | | 398/118 |
| 2002/0141011 | A1* | 10/2002 | Green | H04B 10/1125 |
| | | | | 398/118 |
| 2002/0167702 | A1 | 11/2002 | Badesha et al. | |
| 2004/0037566 | A1 | 2/2004 | Willebrand et al. | |
| 2004/0042396 | A1* | 3/2004 | Brown | H04L 45/28 |
| | | | | 370/227 |
| 2004/0062551 | A1* | 4/2004 | ElBatt | H04B 10/1121 |
| | | | | 398/115 |
| 2004/0258415 | A1* | 12/2004 | Boone | H04B 10/1125 |
| | | | | 398/125 |
| 2005/0259991 | A1 | 11/2005 | Dudelzak et al. | |
| 2005/0288031 | A1* | 12/2005 | Davis | H04W 40/06 |
| | | | | 455/452.1 |
| 2007/0253341 | A1* | 11/2007 | Atkinson | H04L 45/02 |
| | | | | 370/252 |
| 2009/0231181 | A1* | 9/2009 | Yannone | G01S 5/04 |
| | | | | 342/146 |
| 2010/0214974 | A1* | 8/2010 | Elliott | H04W 8/04 |
| | | | | 370/316 |
| 2011/0034191 | A1 | 2/2011 | Leabman | |
| 2011/0100201 | A1 | 5/2011 | Bass | |
| 2012/0039617 | A1 | 2/2012 | Duligall et al. | |
| 2013/0129341 | A1 | 5/2013 | D' et al. | |
| 2013/0177321 | A1 | 7/2013 | Devaul et al. | |
| 2013/0179008 | A1 | 7/2013 | Devaul et al. | |
| 2013/0303218 | A1 | 11/2013 | Teller et al. | |
| 2014/0328597 | A1 | 11/2014 | Bhide | |
| 2015/0171968 | A1 | 6/2015 | Featherston et al. | |

OTHER PUBLICATIONS

Knapek, Development and Implementation of a Pointing, Acquisition and Tracking System for optical Free-Space Communication Systems on High Altitude Platforms, 2005 (Year: 2005).*

Wikipedia, List of UWB channels, 2011 (Year: 2011).*

Reynaud et al., An Integrated Aerial Telecommunications Network that Support Emergency Traffic, 2011 (Year: 2011).*

Yuksel et al., Free-space-optical mobile ad hoc networks: Auto-configurable building blocks, 2007, Springer (Year: 2007).*

Simmons-Boardman, Railway Signaling and Communicaitons, 1965 (Year: 1965).*

Nadeem et al., Comparison of link selection algorithms for free space optics/radio frequency hybrid network, 2011, The Institution of Engineering and Technology (Year: 2011).*

Knapek, Markus , "Development and Implementation of a Pointing, Acquisition and Tracking System for optical Free-Space Communication Systems on High Altitude Platforms", Institut Fur Informatik, May 20, 2005, 88 pages.

Mehdi, Zargham , "Von Neumann Architecture", www2.cs.siu..edu/~cs401/Textbook/ch2., Jan. 19, 2012, 66 pages.

Nadeem , et al., "Comparison of link selection algorithms for free space optics/radio frequency hybrid network", IET Communications, vol. 5, Issue 18, 2011, pp. 2751-2759.

Little, Arthur D., et al., The Business Benefits of 4G LTE, 2012, pp. 1-28.

* cited by examiner

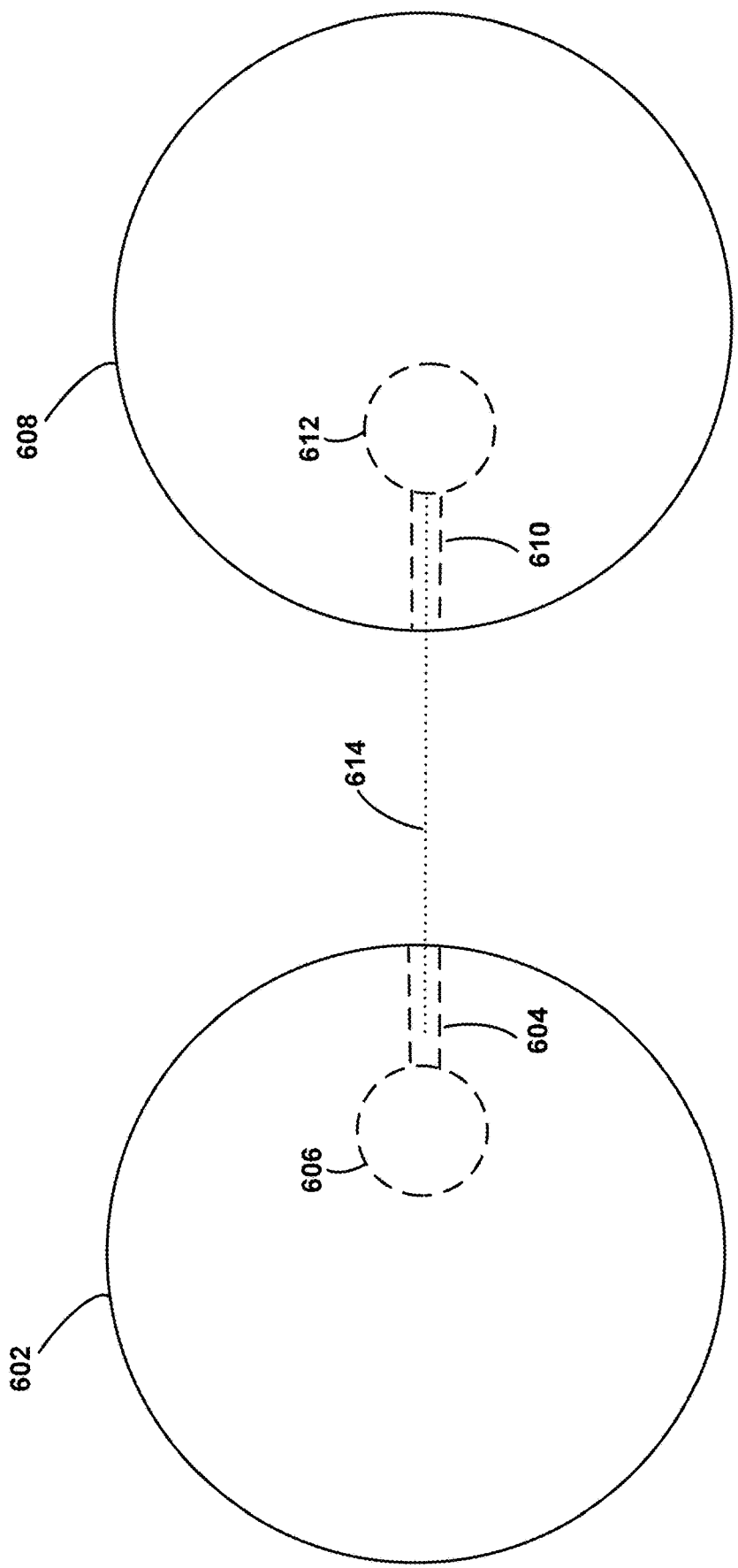

COMMUNICATIONS SYSTEM THAT PROVIDES CONTINUOUS SERVICE

CROSS-REFERENCE TO RELATED APPLICATIONS

This application is a continuation of U.S. application Ser. No. 14/132,300 filed Dec. 18, 2013, the entire disclosure of which is incorporated by reference herein.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

Example methods and systems for using optical communication systems and radio frequency (RF) communication systems for communication involving balloons are described. An optical communication link between two balloons may first be established. A movement of the second balloon relative to the first balloon may then be detected that is expected to cause the optical communication link to become unavailable at a given time. Before the optical link becomes unavailable, an RF link between the two balloons may be established. A movement of the second balloon relative to the first balloon may then be detected such that the optical communication link can be re-established. The optical communication link between the two balloons may then be re-established.

In one example, a method is provided that includes establishing an optical communication link between an optical communication system of a first balloon and an optical communication system of a second balloon, detecting a movement of the second balloon relative to the first balloon, where the movement is expected to cause the optical communication link to become unavailable at a given time during the movement, and where the optical communication link is expected to remain unavailable until the movement is such that the optical communication link can be re-established between the optical communication system of the first balloon and the optical communication system of the second balloon, before the movement causes the optical communication link to become unavailable, establishing a radio frequency (RF) communication link between an RF communication system of the first balloon and an RF communication system of the second balloon, after establishing the RF communication link, detecting that the movement of the second balloon relative to the first balloon is such that the optical communication link between the optical communication system of the first balloon and the optical communication system of the second balloon can be re-established, and re-establishing the optical communication link between the optical communication system of the first balloon and the optical communication system of the second balloon.

In another example, a balloon is provided that includes an RF communication system, an optical communication system, and a control system configured to establish an optical communication link between the optical communication system of the balloon and an optical communication system of a second balloon, detect a movement of the second balloon relative to the balloon, where the movement is expected to cause the optical communication link to become unavailable at a given time during the movement, and where the optical communication link is expected to remain unavailable until the movement is such that the optical communication link can be re-established between the optical communication system of the balloon and the optical communication system of the second balloon, before the movement causes the optical communication link to become unavailable, establish an RE communication link between the RF communication system of the balloon and an RF communication system of the second balloon, after establishing the RF communication link, detect that the movement of the second balloon relative to the balloon is such that the optical communication link between the optical communication system of the balloon and the optical communication system of the second balloon can be re-established, and re-establish the optical communication link between the optical communication system of the balloon and the optical communication system of the second balloon.

In still another example, a method is provided that includes establishing an optical communication link between an optical communication system of a ground-based station and an optical communication system of a balloon, detecting a movement of the balloon relative to the ground-based station, where the movement is expected to cause the optical communication link to become unavailable at a given time during the movement, and where the optical communication link is expected to remain unavailable until the movement is such that the optical communication link can be re-established between the optical communication system of the ground-based station and the optical communication system of the balloon, before the movement causes the optical communication link to become unavailable, establishing an RF communication link between an RF communication system of the ground-based station and an RF communication system of the balloon, after establishing the RF communication link, detecting that the movement of the balloon relative to the ground-based station is such that the optical communication link between the optical communication system of the ground-based station and the optical communication system of the balloon can be re-established, and re-establishing the optical communication link between the optical communication system of the ground-based station and the optical communication system of the balloon.

In yet another example, a system may include means for establishing an optical communication link between an optical communication system of a first balloon and an optical communication system of a second balloon, means for detecting a movement of the second balloon relative to the first balloon, where the movement is expected to cause the optical communication link to become unavailable at a given time during the movement, and where the optical communication link is expected to remain unavailable until the movement is such that the optical communication link can be re-established between the optical communication system of the first balloon and the optical communication system of the second balloon, before the movement causes the optical communication link to become unavailable, means for establishing a radio frequency (RF) communication link between an RF communication system of the first balloon and an RF communication system of the second balloon, after establishing the RF communication link, means for detecting that the movement of the second balloon relative to the first balloon is such that the optical communication link between the optical communication system of the first balloon and the optical communication system of the second balloon can be re-established, and means for re-establishing the optical communication link between the optical communication system of the first balloon and the optical communication system of the second balloon.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 6B illustrates a top view of an optical communication link between two balloons, according to an example embodiment.

DETAILED DESCRIPTION

I. Overview

Figure 1:
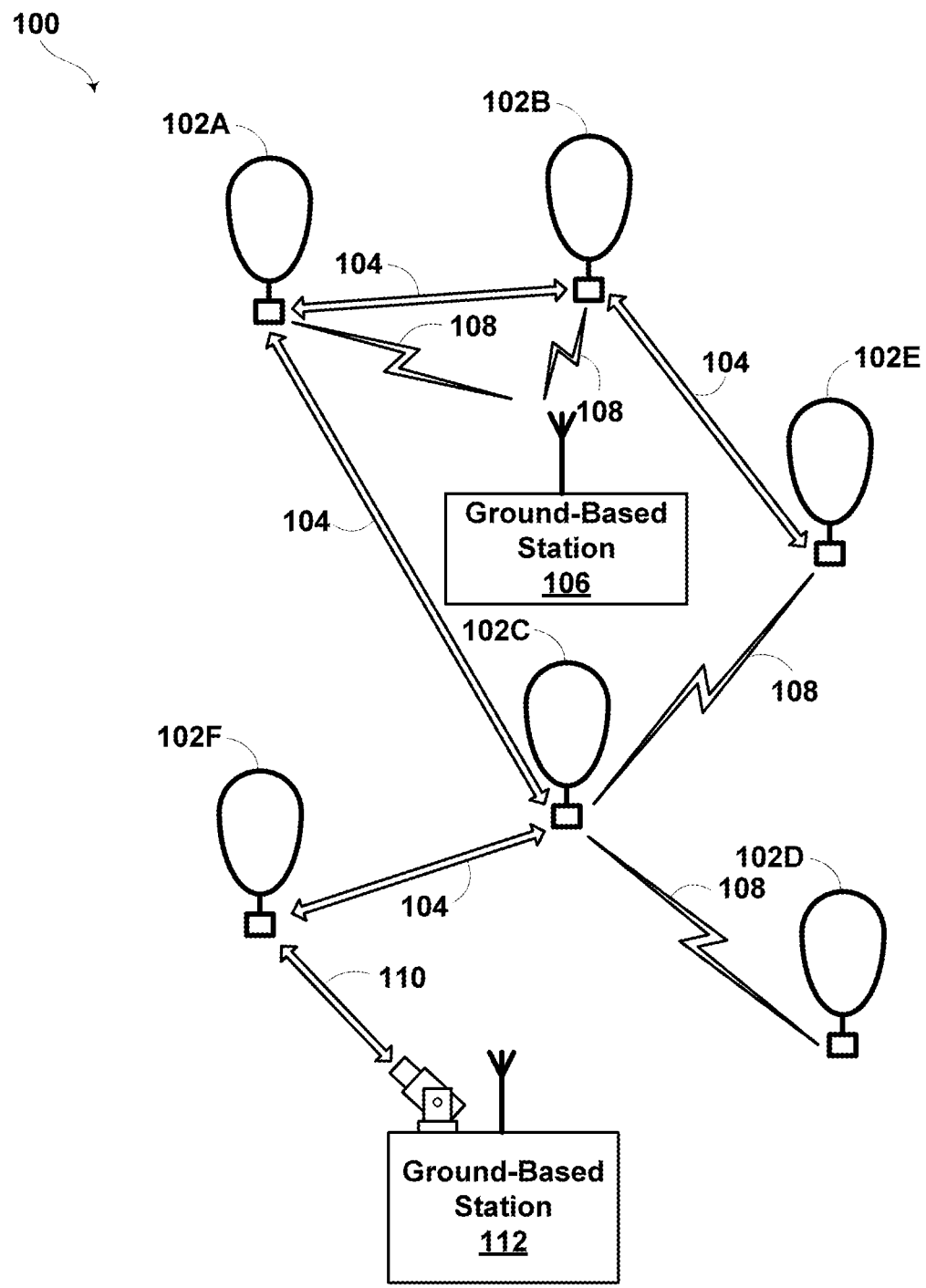
FIG. 1 is a block diagram illustrating an example balloon network.

Examples of methods and systems are described herein. It should be understood that the words "example" and "exemplary" are used herein to mean "serving as an example, instance, or illustration." Any embodiment or feature described herein as "exemplary" is not necessarily to be construed as preferred or advantageous over other embodiments or features. The example or exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Example systems and methods allow for a handoff between different communication systems of balloons, such as high-altitude balloons that are operating as part of a balloon network. In particular, the balloons may be equipped with an optical communication system and a radio frequency (RF) communication system. In some circumstances, an optical communication link may be established between two balloons using the optical communication systems of the balloons. An optical communication link may generally have higher capacity and better performance than an RF communication link using the RF communication systems of the balloons. Accordingly, communication via the optical communication systems of the balloons may be preferred when an optical communication link is available.

In some situations, an optical communication link between two balloons may become unavailable for a certain period of time. For instance, an optical communication link between two balloons may require a directional transceiver from each balloon to be pointed at one another for communication to take place. Depending on where optical transceiver(s) are positioned on the balloons, the transceivers may mechanically only be able to point in certain directions through space and/or may be blocked in some directions by different transceivers or other balloon components. Additionally, due to wind and/or for other reasons, the balloons may be moving in space relative to one another (e.g., rotating, changing altitude, and/or changing horizontal position). In some circumstances, the position and/or orientation of one balloon relative to another balloon may be such that an optical communication link cannot be maintained for some period of time.

In such circumstances where an optical communication link between two balloons may be likely to become unavailable for a certain period of time, an RF communication link between RF communication systems of the balloons may be established before the optical communication link becomes unavailable. Establishing the RF link may help to avoid a discontinuation in service between the two balloons, while the optical link is unavailable.

An RF communication link may be able to provide service in situations where an optical link cannot be maintained. In particular, an RF communication system may be able to cover greater area than an optical communication system. In some examples, an RF communication system may not require transceivers to be pointed at one another. For instance, an RF communication system may be omni-directional (e.g., can transmit and/or receive a signal in all possible directions). In other examples, an RF communication system may be comprised of multiple sectors and/or steered directional links that don't require the same level of coordination as an optical system so that the RF communication system can cover areas that cannot be covered by the optical communication system.

In some examples, RF communication systems may have lower performance ability, and may therefore only be used when an optical communication link is unavailable. After using an RF communication link for a certain period of time, it may be determined that the position and/or orientation of the balloons relative to one another is such that the optical communication link can be re-established. The RF communication link may be maintained while directional optical transceivers are coordinated (e.g., pointed at one another). Then, when the optical communication link has been established, the balloons may resume communicating using the optical link. Some optical communication systems may contain multiple optical transceivers, in which case the optical link may in some cases be re-established using different transceiver(s) than were previously used.

In some examples, other factors besides balloon movements may be used to determine when to switch between optical and RF communication systems as well or instead. For instance, the level of atmospheric interference in the environment (e.g., interference from clouds or precipitation) may require switching to RF systems when optical systems become unavailable for certain periods of time.

Additionally, handoffs between optical and RF communication systems may happen rapidly (e.g., every few seconds) in some examples, such as when a balloon is rotating very fast. In other examples, handoffs may occur less frequently, with optical or RF systems being used continuously for a period of minutes or hours before switching.

In further examples, a balloon may be communicating simultaneously with multiple balloons within the network. In some embodiments, the balloon may switch back and forth between optical communication links and RF communication links with multiple balloons simultaneously as the balloons move and/or rotate within the network. Additionally, the balloon may use its RF communication system to avoid an interruption while establishing an optical communication link with a particular balloon. For instance, the balloon may be communicating with a first balloon using an optical link when a second balloon's position and/or orientation relative to the balloon becomes such that an optical link with the second balloon can be established. The balloon may then use an RF link to communicate with the second balloon while establishing an optical link with the second balloon (e.g., by redirecting an optical transceiver that was previously pointed at the first balloon). Other examples involving handoffs with multiple balloons are also possible.

In additional embodiments, a ground-based station may communicate with one or more balloons within the network by switching between optical communication links and RF communication links. For instance, the ground-based station may be equipped with its own RF and optical communication systems. The station may use an optical communication link to communicate with a balloon which may periodically become unavailable (e.g., as the balloon rotates in space). In such circumstances, the ground-based station may switch to the RF system before the optical link becomes unavailable to avoid a discontinuation in service. Additionally, the station may use its RF system while switching communication to a new balloon as an optical link with the balloon is established.

Example methods therefore may allow for coordinated communication within a balloon network operating balloons containing both optical communication systems and RF communication systems. The RF systems may be used to avoid discontinuations in service during time periods where the optical systems may become unavailable.

II. Example Balloon Networks

In order that the balloons can provide a reliable data network in the stratosphere, where winds may affect the locations of the various balloons in an asymmetrical manner, the balloons in an exemplary network may be configured move latitudinally and/or longitudinally relative to one another by adjusting their respective altitudes, such that the wind carries the respective balloons to the respectively desired locations.

Further, in an exemplary balloon network, the balloons may communicate with one another using free-space optical communications. For instance, the balloons may be configured for optical communications using ultrabright LEDs or possibly lasers for optical signaling (although regulations for laser communications may restrict laser usage). In addition, the balloons may communicate with ground-based station(s) using radio-frequency (RF) communications.

In some embodiments, a high-altitude-balloon network may be homogenous. More specifically, in a homogenous high-altitude-balloon network, each balloon is configured to communicate with nearby balloons via free-space optical links. Further, some or all of the balloons in such a network, may also be configured communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. (Note also that some balloons may be configured to function as both a super-node and a sub-node.)

In such a configuration, the super-node balloons may be configured to communicate with nearby super-node balloons via free-space optical links. However, the sub-node balloons may not be configured for free-space optical communication, and may instead be configured for, e.g., RF communications. Accordingly, a super-node may be further configured to communicate with nearby sub-nodes using RF communications. The sub-nodes may accordingly relay communications from the super-nodes to ground-based station(s) using RF communications. Configured as such, the super-nodes may collectively function as backhaul for the balloon network, while the sub-nodes function to relay communications from the super-nodes to ground-based stations.

FIG. 1 is a simplified block diagram illustrating a balloon network 100, according to an exemplary embodiment. As shown, balloon network 100 includes balloons 102A to 102E, which are configured to communicate with one another via free-space optical links 104. Configured as such, balloons 102A to 102E may collectively function as a mesh network for packet-data communications. Further, balloons 102A to 102D may be configured for RF communications with ground-based stations 106 via RF links 108.

In an exemplary embodiment, balloons 102A to 102E are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102E may generally be configured to operate at altitudes between 17 km and 22 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 22 km may vary with latitude and by season, the variations can be modeled in a reasonably accurate manner. Additionally, altitudes above 17 km are typically above the maximum flight level designated for commercial air traffic. Therefore, interference with commercial flights is not a concern when balloons are deployed between 17 km and 22 km.

To transmit data to another balloon, a given balloon 102A to 102E may be configured to transmit an optical signal via an optical link 104. In an exemplary embodiment, a given balloon 102A to 102E may use one or more high-power light-emitting diodes (LEDs) to transmit an optical signal. Alternatively, some or all of balloons 102A to 102E may include laser systems for free-space optical communications over optical links 104. Other types of free-space optical communication are possible. Further, in order to receive an optical signal from another balloon via an optical link 104, a given balloon 102A to 102E may include one or more optical receivers. Additional details of balloons implementations are discussed in greater detail below, with reference to FIG. 3.

In a further aspect, balloons 102A to 102D may utilize one or more of various different RF air-interface protocols for communication ground-based stations 106 via RF links 108. For instance, some or all of balloons 102A to 102D may be configured to communicate with ground-based stations 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an exemplary network may also include downlink balloons, which provide a high-capacity air-to-ground link.

For example, in balloon network 100, balloon 102E is configured as a downlink balloon. Like other balloons in an exemplary network, a downlink balloon 102E may be operable for optical communication with other balloons via optical links 104. However, a downlink balloon 102E may also be configured for free-space optical communication with a ground-based station 112 via an optical link 110. Optical link 110 may therefore serve as a high-capacity link (as compared to an RF link 108) between the balloon network 100 and a ground-based station 108.

Note that in some implementations, a downlink balloon 102E may additionally be operable for RF communication with around-based stations 106. In other cases, a downlink balloon 102E may only use an optical link for balloon-to-ground communications. Further, while the arrangement shown in FIG. 1 includes just one downlink balloon 102E, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of or in addition to a free-space optical communication system. The high-bandwidth RF communication system may take the form of an ultra-wideband system, which provides an RF link with substantially the same capacity as the optical links 104. Other forms are also possible.

Ground-based stations, such as ground-based stations 106 and/or 108, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102E over an RF link 108. As such, a ground-based station 106 may be configured as an access points via which various devices can connect to balloon network 100. Ground-based stations 106 may have other configurations and/or serve other purposes without departing from the scope of the invention.

Further, some ground-based stations, such as ground-based station 108, may be configured as gateways between balloon network 100 and one or more other networks. Such a ground-based station 108 may thus serve as an interface between the balloon network and the Internet, a cellular service provider's network, and/or other types of networks. Variations on this configuration and other configurations of a ground-based station 108 are also possible.

A. Mesh-Network Functionality

As noted, balloons 102A to 102E may collectively function as a mesh network. More specifically, since balloons 102A to 102E may communicate with one another using free-space optical links, the balloons may collectively function as a free-space optical mesh network.

In a mesh-network configuration, each balloon 102A to 102E may function as a node of the mesh network, which is operable to receive data direct to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

Further, in order to operate as a mesh network, balloons 102A to 102E may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102E move relative to one another and/or relative to the ground. Accordingly, an exemplary balloon network 100 may apply a mesh protocol to update the state of the network as the topology of the network changes. For example, to address the mobility of the balloons 102A to 102E, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102E may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for improving QoS may be employed when determining a lightpath. Other techniques are also possible.

B. Station-Keeping Functionality

In an exemplary embodiment, a balloon network 100 may implement station-keeping functions to help provide a desired network topology. For example, station-keeping may involve each balloon 102A to 102E maintaining and/or moving into a certain position relative to one or more other balloons in the network (and possibly in a certain position relative to the around). As part of this process, each balloon 102A to 102E may implement station-keeping functions to determine its desired positioning within the desired topology, and if necessary, to determine how to move to the desired position.

The desired topology may vary depending upon the particular implementation. Ln some cases, balloons may implement station-keeping to provide a substantially uniform topology. In such case, a given balloon 102A to 102E may implement station-keeping functions to position itself at substantially the same distance (or within a certain range of distances) from adjacent balloons in the balloon network 100.

In other cases, a balloon network 100 may have a non-uniform topology. For instance, exemplary embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an exemplary balloon network may be dynamic and adaptable. In particular, station-keeping functionality of exemplary balloons may allow the balloons to adjust their respective positioning in accordance with a change in the desired topology of the network. For example, one or more balloons could move to new positions to increase or decrease the density of balloons in a given area. Further, in some embodiments, balloons may be in continuous or nearly continuous motion, and station-keeping may involve moving balloons so as to try to meet certain requirements for e.g., coverage in various areas.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

C. Control of Balloons in a Balloon Network

Figure 2:
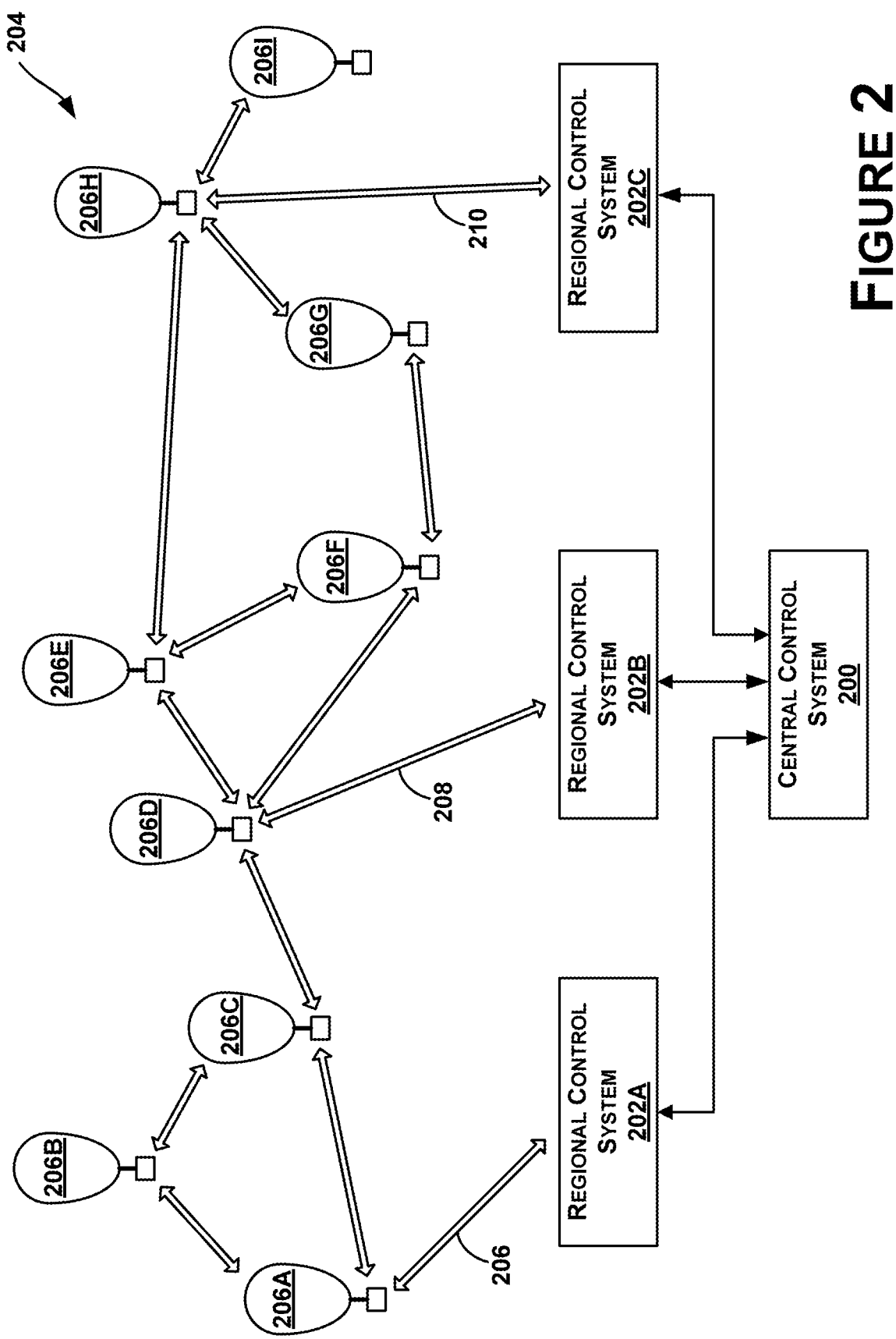
FIG. 2 is a block diagram illustrating an example balloon-network control system.

In some embodiments, mesh networking and/or station-keeping functions may be centralized. For example, FIG. 2 is a block diagram illustrating a balloon-network control system, according to an exemplary embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 204A, 204D, and 204H are configured as downlink balloons. As such, regional control systems 202A to 202C may respectively communicate with balloons 204A, 204D, and 204H via optical links 206, 208, and 210, respectively.

In the illustrated configuration, where only some of balloons 206A to 206I are configured as downlink balloons, the balloons 206A, 206D, and 206H that are configured as downlink balloons may function to relay communications from central control system 200 to other balloons in the balloon network, such as balloons 206B, 206C, 206E to 206G, and 206I. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202B may in fact just be particular type of ground-based station that is configured to communicate with downlink balloons (e.g., such as ground-based station 112 of FIG. 1). Thus, while not shown in FIG. 2, the control system shown in FIG. 2 may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

As noted, FIG. 2 shows a distributed-control arrangement, with regional control systems 202A to 202C coordinating communications between a central control system 200 and a balloon network 204. Such an arrangement may be useful in a balloon network that covers a large geographic area. In some embodiments, a distributed control system may even support a global balloon network that provides coverage everywhere on earth. Of course, a distributed-control arrangement may be useful in other scenarios as well.

Further, it should be understood that other control-system arrangements are possible. For instance, some implementations may involve a distributed control system with additional layers (e.g., sub-region systems within the regional control systems, and so on). Alternatively, control functions may be provided by a single, centralized, control system, which communicates directly with one or more downlink balloons.

In a further aspect, control and coordination of a balloon network may be shared between a ground-based control system and a balloon network to varying degrees, depending upon the implementation. In fact, in some embodiments, there may be no ground-based control system. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

D. Illustrative Balloon Configurations

Figure 3:
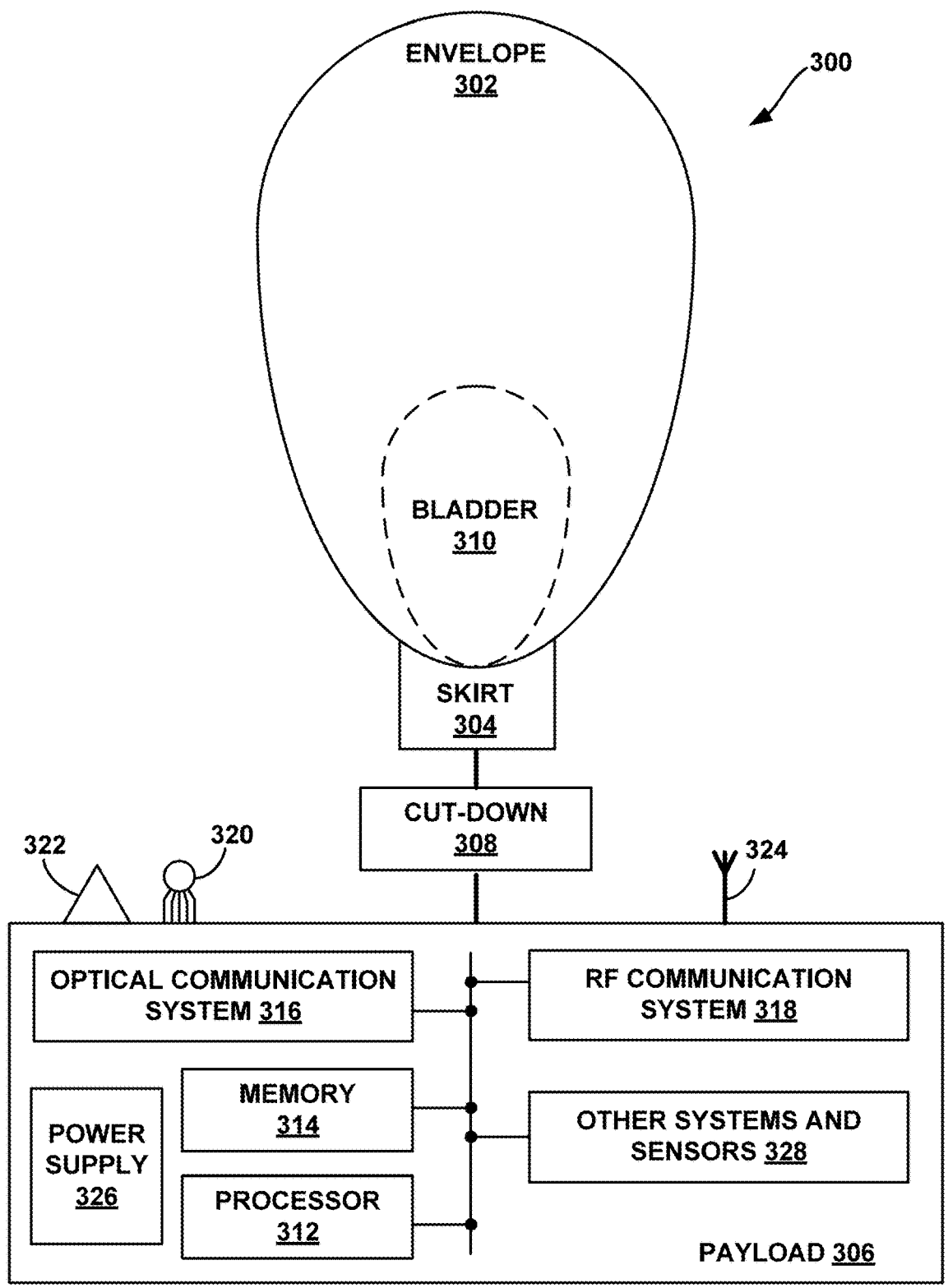
FIG. 3 shows a high-altitude balloon according to an example embodiment.

Various types of balloon systems may be incorporated in an exemplary balloon network. As noted above, an exemplary embodiment may utilize high-altitude balloons, which typically operate in an altitude range between 17 km and 22 km. FIG. 3 is a simplified block diagram illustrating a high-altitude balloon 300, according to an exemplary embodiment. As shown, the balloon 300 includes an envelope 302, a skirt 304, a payload 306, and a cut-down system 308 that is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photo-diode receiver system). Further, payload 306 may include an RF communication system 318 which may transmit and/or receive RF communications via an antenna system 324. The payload 306 may also include a power supply 326 to supply power to the various components of balloon 300.

Further, payload 306 may include various types of other systems and sensors 328. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 306 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow air to escape from bladder 310.

Further, the balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground.

Note that movement and locations of balloons, such as balloon 300, can vary since winds in the stratosphere may affect the locations of the balloons in a differential manner. A balloon in an example network may be configured to change its horizontal position by adjusting its vertical position (i.e., altitude). For example, by adjusting its altitude, a balloon may be able to find winds that will carry the balloon horizontally (e.g., latitudinally and/or longitudinally) to a desired horizontal location. Wind speed and/or direction may vary with altitude, and since current wind velocities as well as weather forecasts are available, in principle, a balloon may be directed to a location by identifying an altitude at which a wind direction takes a balloon to along a desired trajectory. However, a balloon without other forms of propulsion may be constrained to follow the wind and there may not be a single altitude with winds taking the balloon along the desired trajectory. In addition, to control a fleet of balloons, movement of the balloons should occur from one location above the surface of the Earth to another in a predictable manner.

E. Example Heterogeneous Network

In some embodiments, a high-altitude-balloon network may include super-node balloons, which communicate with one another via optical links, as well as sub-node balloons, which communicate with super-node balloons via RF links. Generally, the optical links between super-node balloons have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
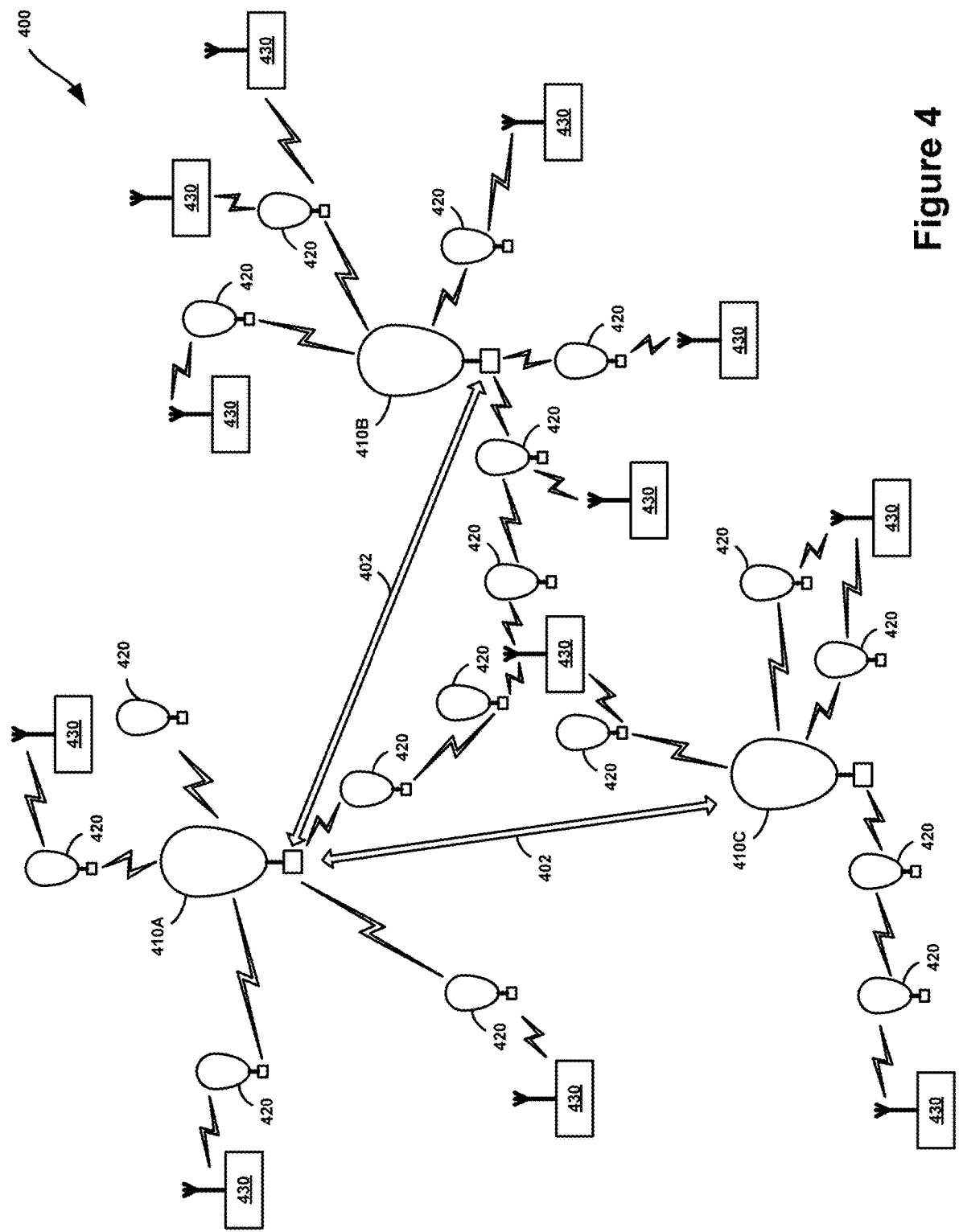
FIG. 4 is a simplified block diagram illustrating a balloon network that includes super-nodes and sub-nodes, according to an example embodiment.

FIG. 4 is a simplified block diagram illustrating a balloon network that includes super-nodes and sub-nodes, according to an exemplary embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at speeds of 10 to 50 GB/sec.

A larger number of balloons may then be configured as sub-nodes, which may communicate with ground-based Internet nodes at speeds on the order of approximately 10 MB/sec. Configured as such, the sub-nodes 420 may be configured to connect the super-nodes 410 to other networks and/or to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to balloon network 400.

III. Example Methods Involving Balloons

Figure 5:
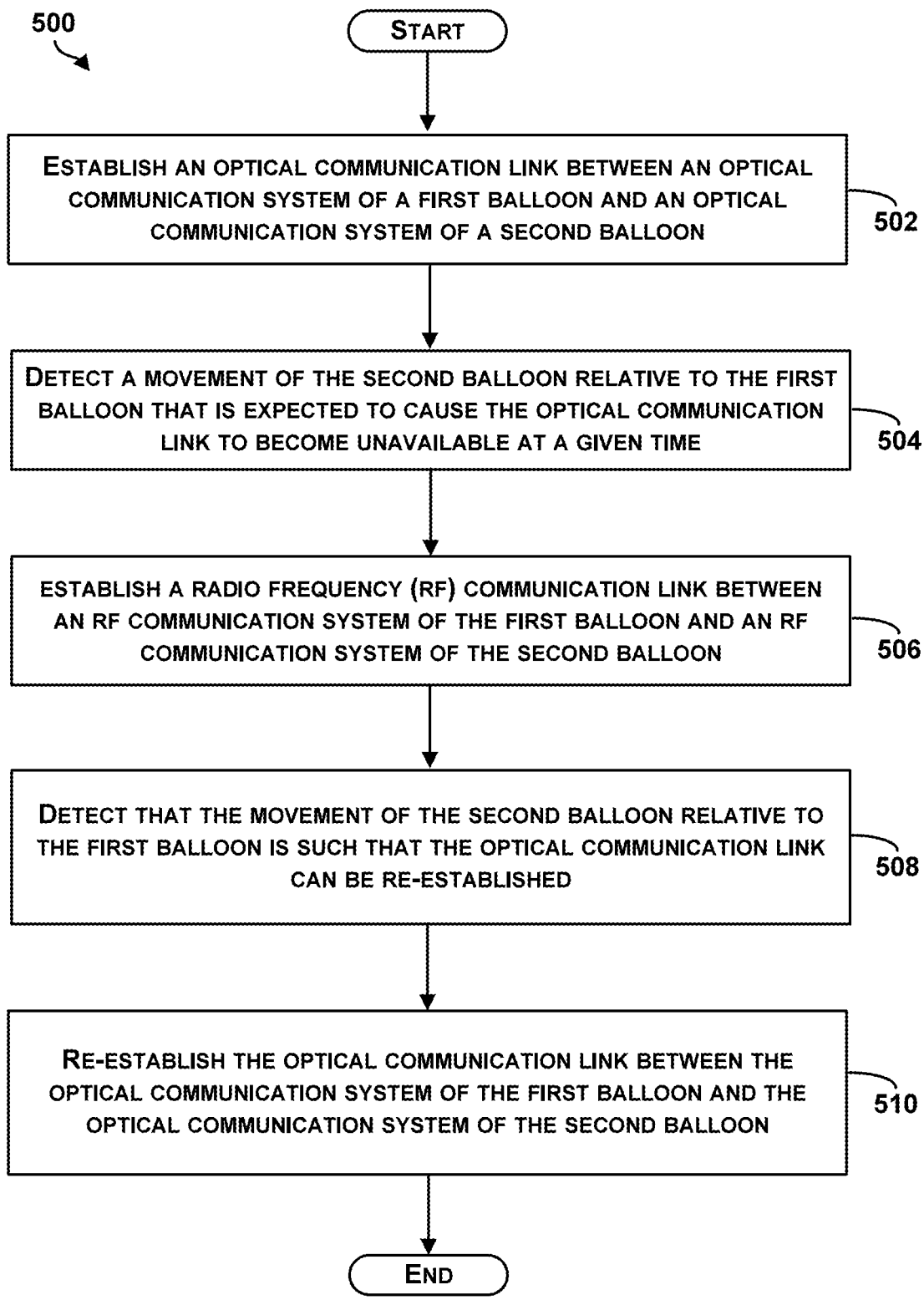
FIG. 5 is a block diagram of a method, according to an example embodiment.

FIG. 5 is a block diagram of a method, according to an example embodiment.

The method 500 may be carried out by a control system of a balloon network. For example, some or all of method 500 may be carried out by a central control system and/or regional systems such as the ones described above with respect to FIG. 2. The control system(s) may communicate with the balloons within the balloon network. In further examples, all or some of method 500 may be carried out by one or more computing systems located on the individual balloons. In some examples, the parts of the method 500 may be combined, separated into additional parts, and/or carried out in a different order than shown. Other configurations are also possible.

More specifically, the method 500 may initially involve establishing an optical communication link between an optical communication system of a first balloon and an optical communication system of a second balloon, as shown by block 502. Each balloon may be equipped with a free-space optical communication system that allows for coordinated optical communication between the balloons. For instance, the balloons may be configured for optical communications using lasers and/or ultra-bright LEDs (which are also referred to as "high-power" or "high-output" LEDs).

Additionally, the optical communication system of a balloon may include one or more optical communication components with a pointing mechanism in order to send and/or receive signals along a directed axis. The optical communication components may include an optical receiver, an optical transmitter, and/or an optical transceiver. Two balloons may communicate with one another using their optical communication systems by coordinating the direction of optical communication components (e.g., pointing an optical transceiver from each balloon at one other).

Figure 6A:
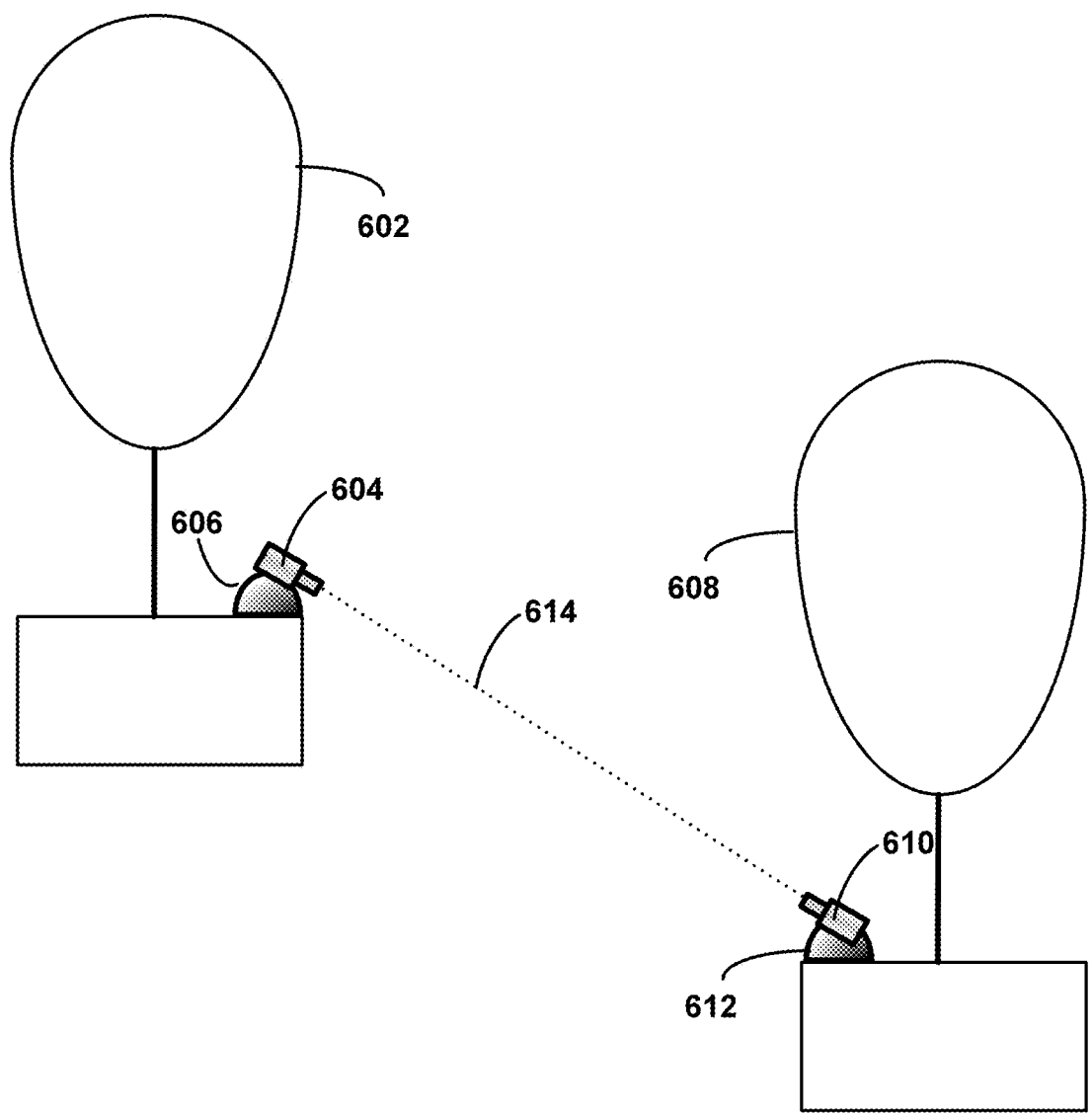
FIG. 6A illustrates an optical communication link between two balloons, according to an example embodiment.

FIG. 6A illustrates an optical communication link, according to an example embodiment. FIG. 6B illustrates a top view of an optical communication link, according to an example embodiment. As shown, a first balloon 602 may contain an optical communication system that includes an optical communication component, such as a transceiver 604. Additionally, the optical communication system may include a mechanism for directing the transceiver 604, shown here as a gimbal 606. The gimbal 606 may be used to rotate the transceiver 604 along one or more axes in order to direct an optical signal. A second balloon 608 may also be equipped with an optical communication, component, such as a transceiver 610 and a gimbal 612.

In order to establish an optical communication link, a control system may cause the gimbal 606 on the first balloon 602 to point the transceiver 604 along an axis 614 directed toward the second balloon 608 in order to send and/or receive signals to and/or from the second balloon 608. Additionally, a control system may cause the gimbal 612 on the second balloon 608 to point the transceiver 610 along the same axis 614 to send and/or receive signals to and/or from the first balloon 602. Instructions used to establish an optical link may come from control systems on either one of the balloons, on both of the balloons, and/or on a remote balloon or station. In some examples, an approximation of the axis 614 may first be determined by systems on one or both of the balloons. A control system may then adjust the directions of the transceivers 604 and 610 within a scanning range until a free-space optical link is established.

In some examples, the optical communication system on the first balloon 602 may be the same as the optical communication system on the second balloon 608. In other examples, the optical communication systems of the balloons may be different (e.g., one balloon may be equipped with a transceiver while another balloon is equipped with a separate transmitter and receiver). Additionally, some balloons may be equipped with multiple separate optical communication components. For instance, a balloon may contain one optical transceiver on top of the payload as shown in FIG. 6A and a separate optical transceiver underneath the payload. In another example, a balloon may contain several optical transceivers stacked on top of one other, either on top of the payload or beneath the payload. Multiple transceivers may be positioned on balloons in other ways as well.

Method 500 may then involve detecting a movement of the second balloon relative to the first balloon that is expected the cause the optical communication link to become unavailable at a given time, as shown by block 504. The position and/or orientation of the second balloon relative to the first balloon may change over time. Either one or both of the balloons may be moving within space in different ways, such as rotating, changing altitude, and/or changing horizontal (latitudinal and/or longitudinal) position. In some examples, these movements may be controlled or partially controlled by a control system, such as to achieve particular objectives within a balloon network (e.g., providing coverage over certain areas on the ground). In other examples, these movements may result from natural forces within the environment (e.g., wind may cause a balloon to rotate or a temperature drop at night may cause a balloon to change altitude).

As movements of one or both of the balloons occur, the optical communication systems of the balloons may be controlled in order to maintain the optical communication link (e.g., by adjusting the direction of one or both transceivers to keep them aligned). In some circumstances, it may be expected that a movement of one or both of the balloons may be likely to cause the optical communication link between the balloons to become unavailable. The optical communication systems of the balloons may be limited in regards to what directions they can point. For instance, a gimbal may be mechanically limited in which directions it can point a transceiver. Additionally, obstruction from other communication components or different balloon components may also limit the directions along which an optical communication link may be maintained. In some circumstances, movements of one or both of the balloons may cause the position and/or orientation of the second balloon relative to the first balloon to be such that the optical link cannot be maintained.

Figure 6C:
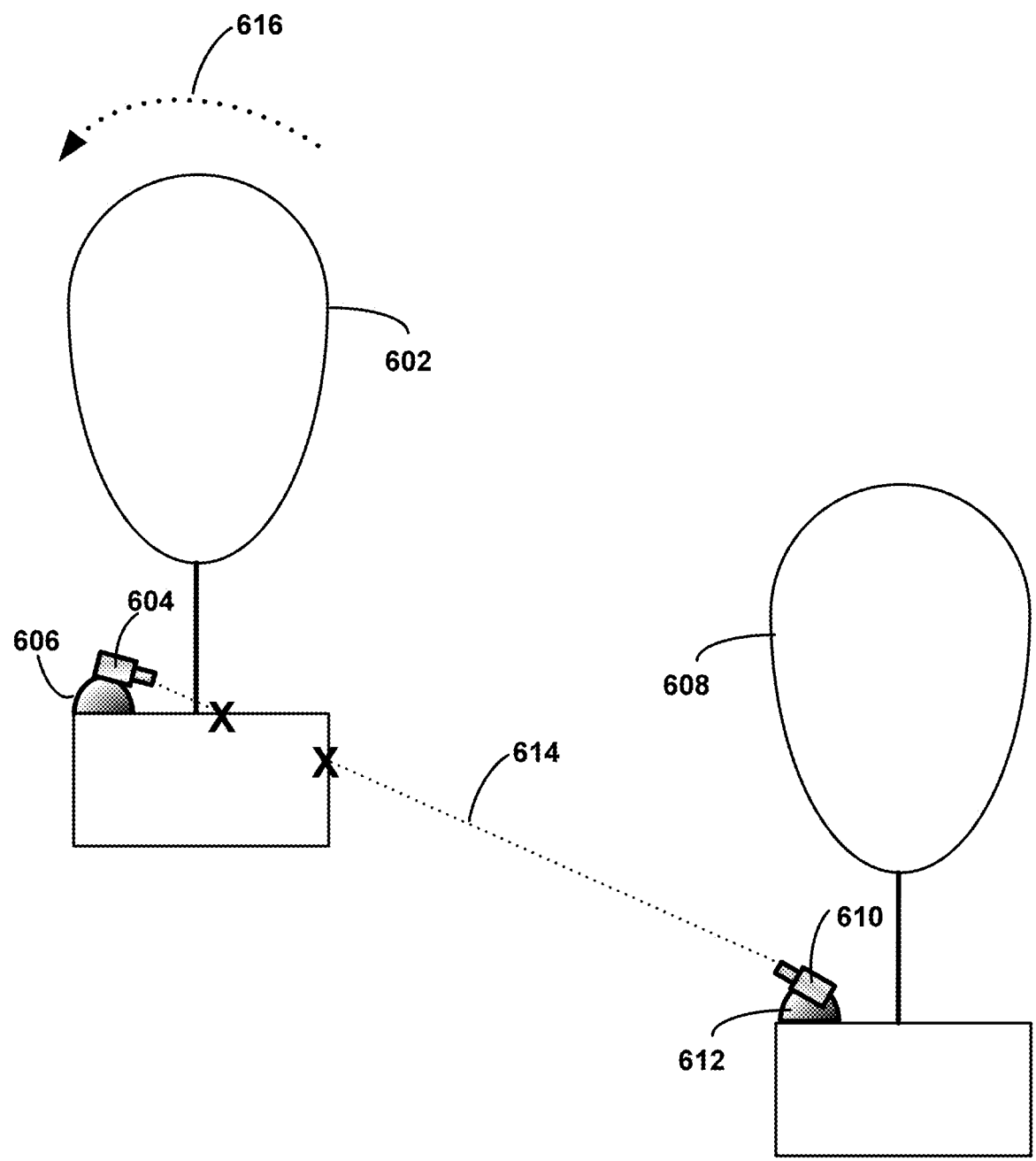
FIG. 6C illustrates a disruption of the optical communication link from FIG. 6A based on a rotation of a balloon, according to an example embodiment.

FIG. 6C shows a situation where a movement of the second balloon relative to the first balloon may cause the optical link to become unavailable, according to an example embodiment. As shown, a rotation 616 of the first balloon 602 may change the position of the transceiver 604 on the first balloon 602 relative to the second balloon 608. In such a circumstance, it may not be possible to direct the transceiver 604 from the first balloon 602 and the transceiver 610 from the second balloon 608 along an axis 614 to allow for free-space optical communication. For example, as shown here, the payload of the first balloon 602 may obstruct the optical link.

Figure 6D:
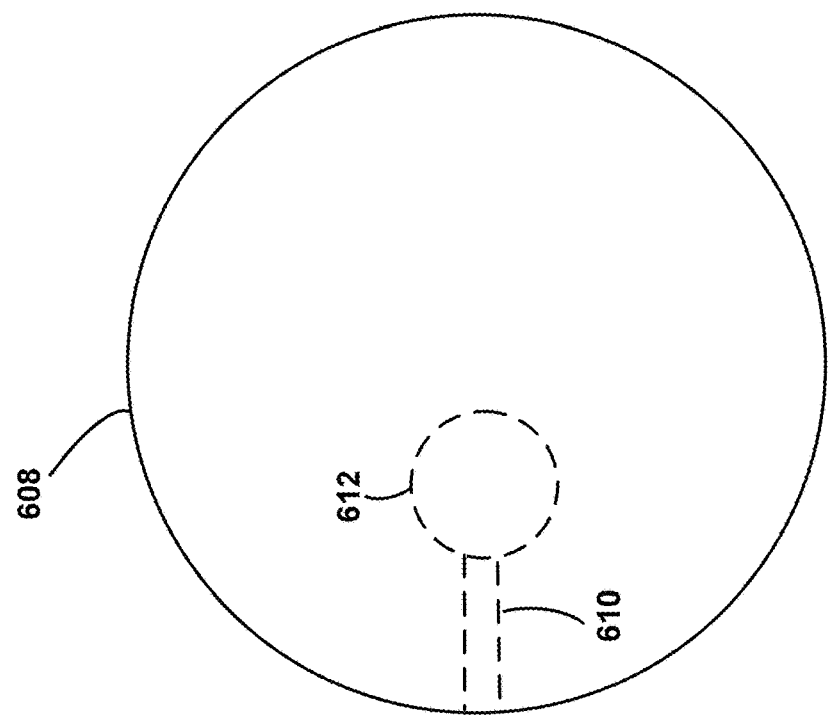
FIG. 6D illustrates a top view of a disruption of the optical communication link from FIG. 6B based on a rotation of a balloon, according to an example embodiment.
Figure 6D:
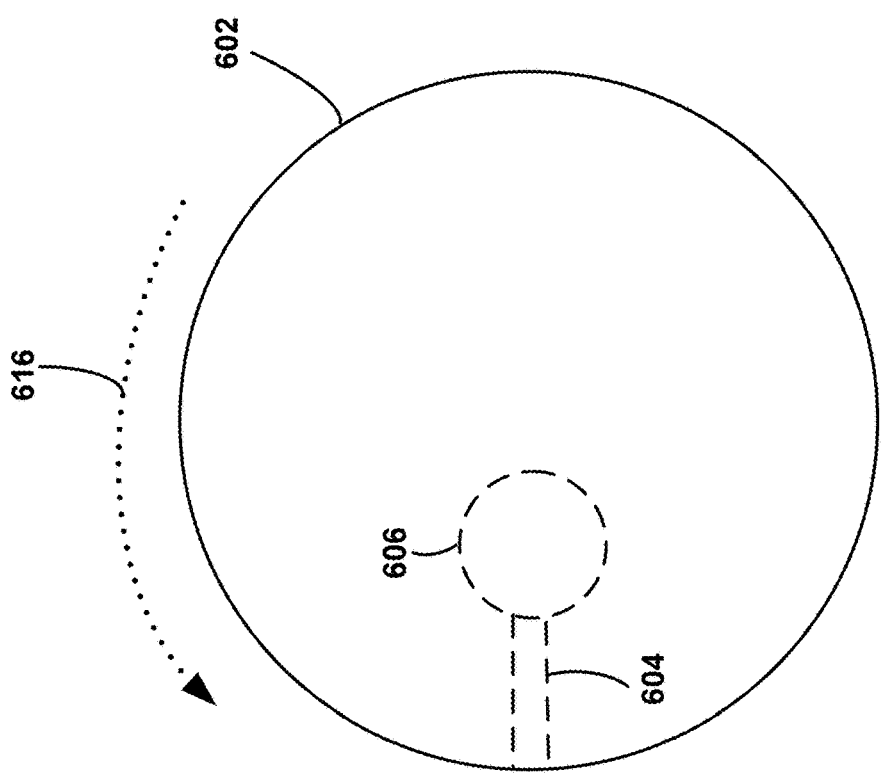

In other examples, obstruction from other components or mechanical limitations of optical communication components may cause a situation where the optical link may become unavailable as well. For instance, FIG. 6D shows a top view of a configuration of the two balloons, according to an example embodiment. In this example, the optical transceiver 604 may be mechanically limited such that a rotation 616 of the first balloon 602 makes it impossible for the transceiver 604 to point at the transceiver 610 on the second balloon 608.

In some examples, a computing system may determine that the optical link is likely to become unavailable at a given time, which may be some time in the future (e.g., in 1 second or 1 minute or 1 hour). Additionally, the given time may be an estimate based on current balloon movements. For example, it may be predicted that if a particular balloon continues to rotate at the current speed, the optical communication link may become unavailable in five seconds.

In additional examples, a prediction may also be made about when the optical link may be re-established. For instance, it may be predicted that if a particular balloon continues to rotate at the current speed, the optical communication link may become unavailable in five seconds and may become available again in ten seconds. In other examples, it may not be known when or if an optical communication link may become available again. For instance, one balloon may rise in altitude to a position where an optical link cannot be maintained, and it may not be known when or if the balloon will fall to a level where an optical link may be re-established.

Additionally, environmental factors may also affect whether or not an optical link may be maintained. For instance, atmospheric interference (e.g., from clouds or fog or rain) may limit the feasibility or range of optical communication. In some examples, predictions about environmental conditions and/or atmospheric interference may be used to determine when an optical communication link may become unavailable as well. In further examples, a combination of factors (including movements of the first and/or second balloon, weather conditions, and possibly other factors) may be used to make determinations about when an optical communication link may become unavailable.

Method 500 may then involve establishing a radio frequency (RF) communication link between an RF communication system of the first balloon and an RF communication system of the second balloon, as shown by block 506. Each balloon may be equipped with an RF communication system that is operable for packet-data communication over one or more RF air interfaces. For instance, an RF communication system of a balloon may use one or more antennas to transmit and/or receive RF communications to and/or from one or more other balloons.

In some examples, directional coordination may not be required to establish an RF communication link between RF communication systems of two balloons. For instance, an RF communication system may be omnidirectional (e.g., capable of listening and transmitting in all directions). In other examples, a balloon may be equipped with one or more RF interfaces for transmitting and/or listening along certain sectors or bands. For instance, a balloon may be equipped with an example RF communication system that can transmit a signal 360 degrees around the balloon with a vertical angle of ten degrees or twenty degrees. As another example, a balloon's RF communication system may include four separate RF interfaces, each capable of transmitting and/or receiving within one of four quadrants of the balloon. In yet other examples, a balloon's RF communication system may include directional links which may not require the same amount of precision in alignment in order to establish a communication link as required by optical systems. For instance, optical systems may require an axis to be aligned within a fraction of a degree while directional RF systems may be able to communicate across much greater ranges of space. Other types of RF communication systems may be able to operate in situations where an optical communication link may become unavailable as well.

Figure 6E:
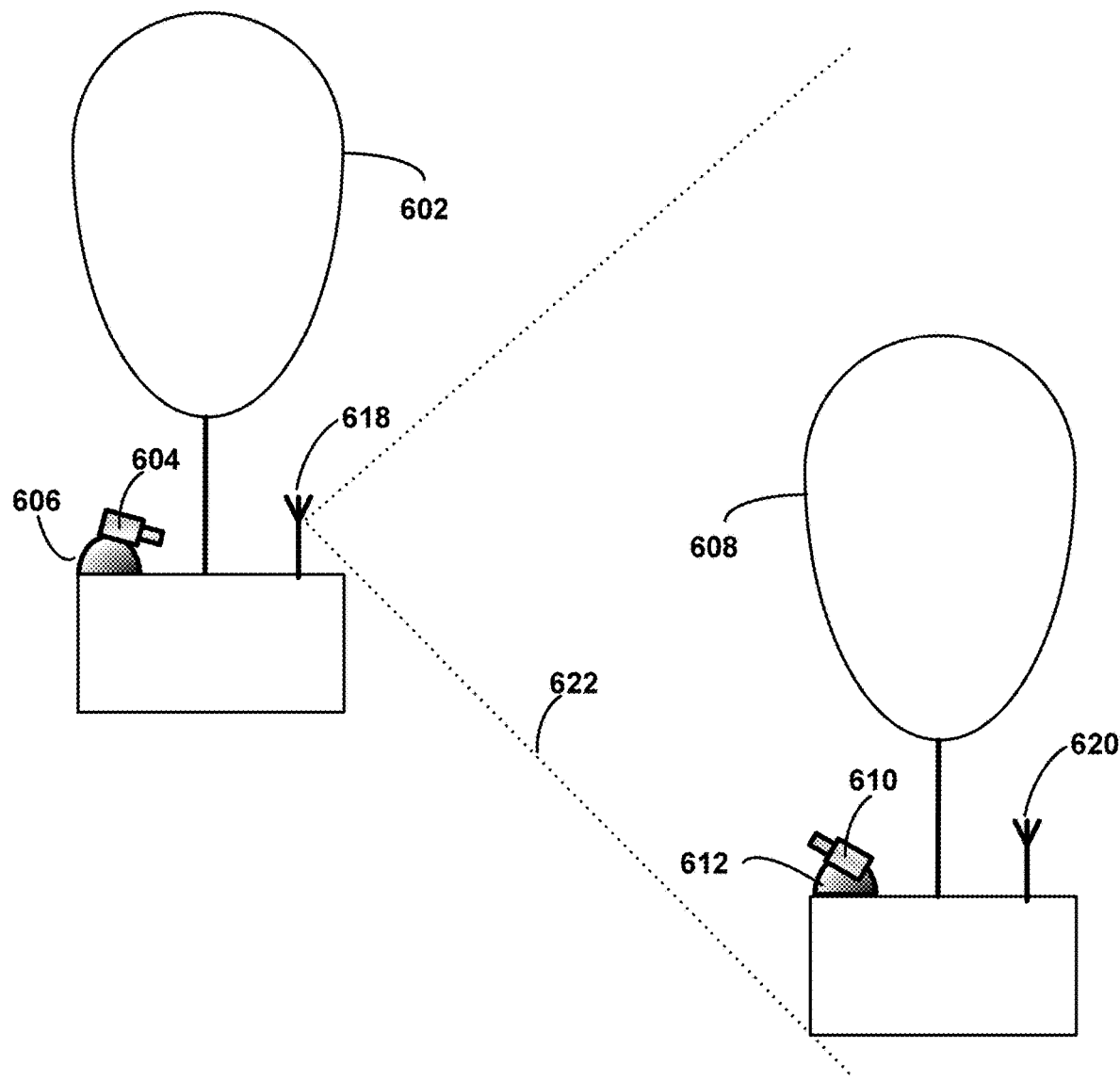
FIG. 6E illustrates an RF communication link between the two balloons from FIG. 6A, according to an example embodiment.

FIG. 6E shows an RF communication link between the two balloons from FIG. 6C, according to an example embodiment. As shown, an antenna 618 located on the first balloon 602 may communicate with a certain beam width 622. The beam width 622 may be large enough to reach an antenna 620 located on the second balloon 608. In some examples, an RF signal may be sent from the antenna 620 located on the second balloon 608 back to the antenna 618 on the first balloon 602. Accordingly, an RF communication link may be established between the first balloon 602 and the second balloon 608.

The RF communication link may be used during times in which the balloons have moved into a relative position such that an optical communication link may be unavailable. For instance, as shown in FIG. 6E, the RF communication link may be used after the first balloon 602 has rotated into a position where the optical communication systems are obstructed and cannot form an optical communications link. An RF link may be available in other circumstances when an optical link is unavailable as well. For instance, RF communication systems may be able to operate in atmospheric conditions where optical links between balloons are obscured.

In some examples, the RF communication link between the two balloons may be established some amount of time before the optical communication link becomes unavailable in order to prevent a discontinuation in service. For example, a prediction may be made that the optical link may become unavailable at a certain time in the future, and an RF link may be established beforehand with a chosen time buffer (e.g., 1 second or 1 minute). In further examples, a control system may sometimes fail to predict when an optical communication link may become unavailable. In such examples, once it is determined that the optical link is unavailable, an RF communication link may be initiated in order to minimize any down time in the communication between the two balloons.

Method 500 may then involve detecting that the movement of the second balloon relative to the first balloon is such that the optical communication link can be re-established, as shown by block 508. As the first balloon and/or the second balloon move within space (e.g., rotate or change position), they may move into a relative position and orientation such that an optical link can be re-established between the balloons. In some examples, this may occur shortly after the RF communication link was established (e.g., 1 second) or it may occur after a longer period of time (e.g., 1 day).

In further examples, the detection may be made in advance before the balloons have aligned such that an optical link can be re-established. For instance, a prediction may be made that if a particular balloon continues to rotate at a particular speed, it may be possible to re-establish an optical link at a certain time. In other examples, the detection may be made after the balloons have aligned in a position where an optical link can be re-established.

Figure 6F:
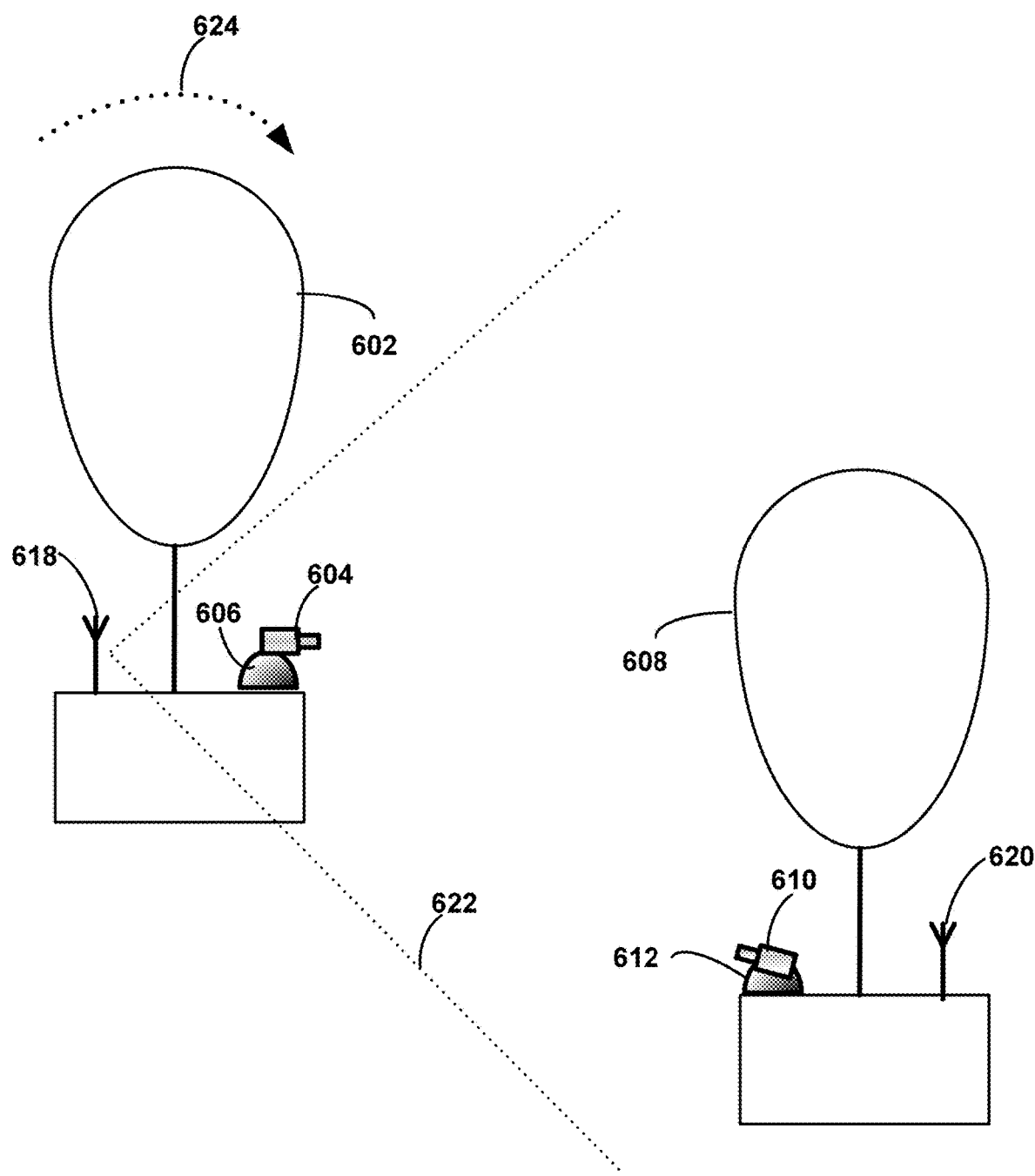
FIG. 6F illustrates a situation where the optical communication link from FIG. 6A can be re-established based on a rotation of a balloon, according to an example embodiment.

FIG. 6F shows a situation where an optical link can be re-established, according to an example embodiment. As shown, the first balloon 602 may have continued to rotate in a particular direction 624. The transceiver 604 of the first balloon 602 may now be positioned such that it can establish an optical link with the transceiver 610 of the second balloon 608. As shown in the Figure, the RF communication link between the antenna 618 on the first balloon 602 and the antenna 620 on the second balloon 608 may continue to be used while an optical link has not yet been re-established.

In additional examples, movements of the second balloon relative to the first balloon that may enable an optical link to be re-established may include rotations of either or both balloons, changes in altitude of either or both balloons, and/or changes in latitudinal or longitudinal position of either or both balloons. Also, in some examples, other factors may also change which could enable an optical link to be re-established. For instance, the level of atmospheric interference may drop, enabling the balloons to switch back to their optical systems.

Method 500 may then involve re-establishing the optical communication link between the optical communication system of the first balloon and the optical communication system of the second balloon, as shown by block 510. Once it is determined that an optical link can be re-established, optical communication components of each balloon may be aligned using a similar procedure as when an optical link was first established. For instance, a control system on one or both of the balloons may point a transceiver from each balloon toward one another, and possibly refine the pointing directions of the transceivers once a scanning range has been determined. The RF communication link may continue to be used while the optical link is re-established.

Figure 6G:
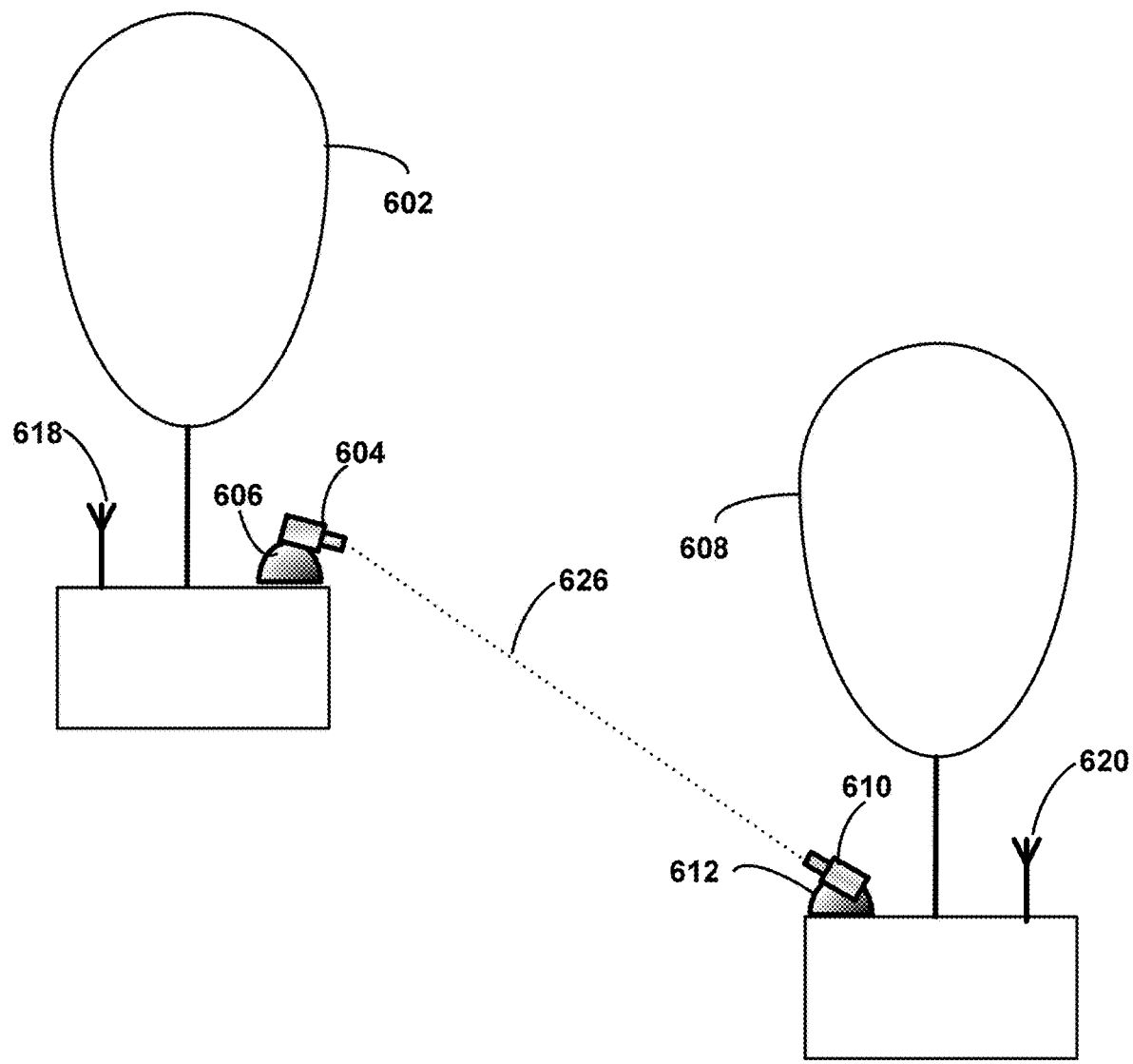
FIG. 6G illustrates re-establishment of the optical communication link from FIG. 6A, according to an example embodiment.

FIG. 6G shows an optical link between two balloons which has been re-established, according to an example embodiment. As shown, a transceiver 604 on the first balloon 602 may now be pointed toward a transceiver 610 on the second balloon 608 so that the optical link can be re-established along an axis 626. In some examples, the balloons may stop transmitting and receiving data using the RF antennas 618 and 620 once the optical link has been re-established.

In further examples, the axis 626 may sometimes be the same axis 614 used to communicate along the optical link previously. In other examples, the axis 626 may be different as the balloons may have changed relative position and/or orientation from when the optical link was used previously. Additionally, in some examples, a different transceiver may be used by one or both of the balloons in order to re-establish the optical link. One or both of the balloons may be equipped with optical communication components at multiple places on the balloons. Accordingly, in some cases, an optical communication link may be re-established using a different component. For instance, the first balloon may be aligned relative to the second balloon such that a transceiver on top of the first balloon's payload may be used to communicate with the second balloon for some time. Later (e.g., after completing one or more rotations), the first balloon may then be aligned relative to the second balloon such that a transceiver underneath the first balloon's payload can be used to communicate with the second balloon. Other examples of using multiple transceivers exist as well.

In some examples, a balloon may be operating as part of a balloon network and communicating simultaneously with multiple other balloons within the network. In such examples, a balloon may be using handoff methods described above to switch back and forth between optical communication links and RF communication links with different balloons at the same time.

In additional examples, a balloon may switch which balloon it is using its optical communication system to communicate with. For instance, the balloon may be communicating with a second balloon using an optical link when a third balloon comes into range. In some examples, the balloon may use its RF communication system to avoid a discontinuation in service while establishing a new optical link with the third balloon.

Figure 7A:
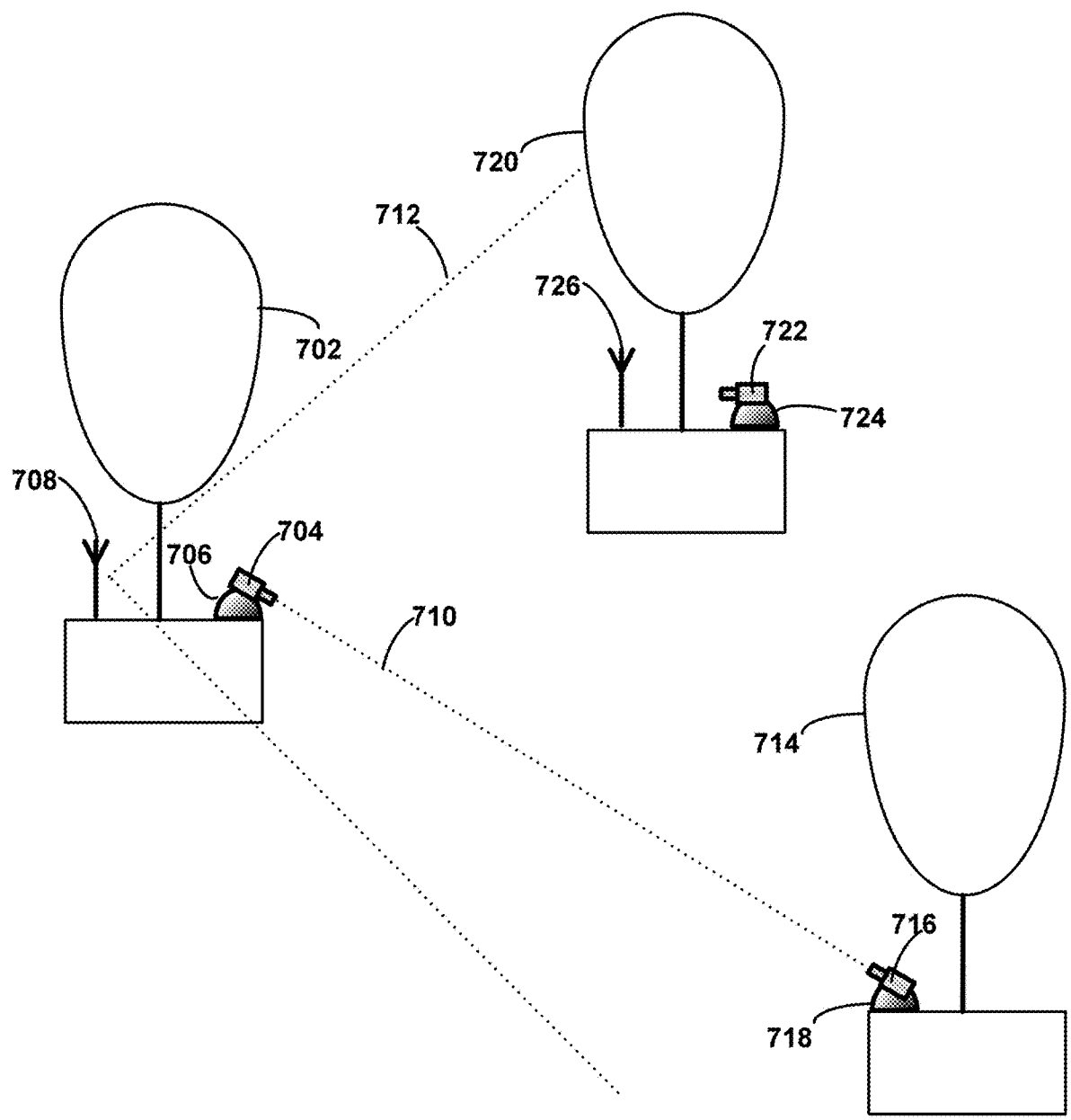
FIG. 7A illustrates an optical communication link with a second balloon and an RF communication link with a third balloon, according to an example embodiment.

FIG. 7A shows an example of a balloon communicating with a second balloon using an optical communication link and a third balloon using an RF communication link, according to an example embodiment. As shown, a first balloon 702 may be communicating with a second balloon 714 using an optical communication link along an axis 710 between a transceiver 704 on the first balloon 702 and a transceiver 716 on the second balloon 714. The first balloon 702 may also be simultaneously communicating with a third balloon 720 using an RF communication link by sending and/or receiving RF signals from an antenna 708 on the first balloon 702 to and/or from an antenna 726 on the second balloon 720. Other examples of simultaneous balloon-to-balloon communication are also possible (e.g., a balloon could use multiple optical transceivers to communicate with multiple balloons simultaneously).

Figure 7B:
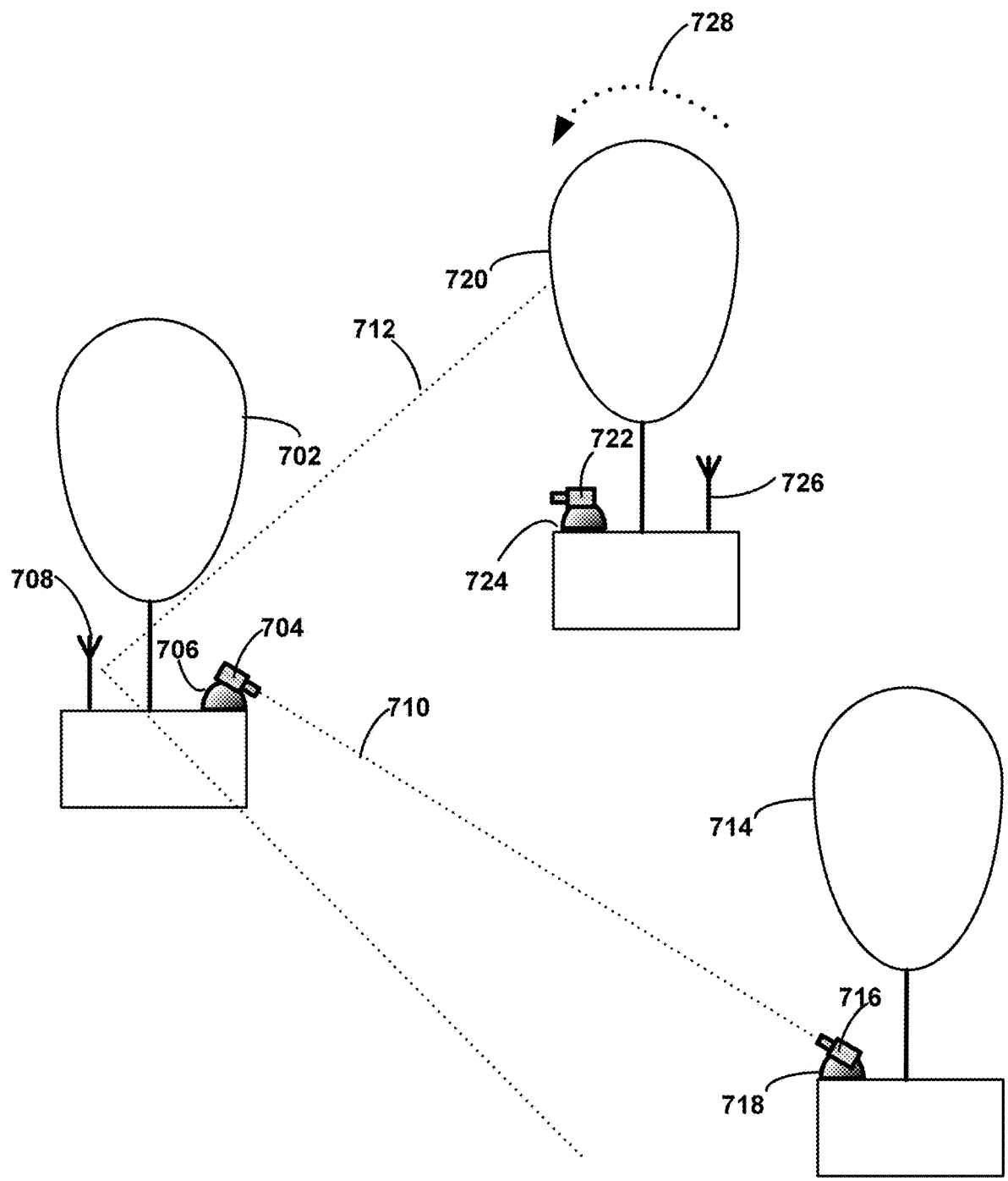
FIG. 7B illustrates a situation where an optical communication link can be established with the third balloon from FIG. 7A based on a rotation of the third balloon, according to an example embodiment.

FIG. 7B shows a situation where an optical communication link with the third balloon may now be established, according to an example embodiment. As shown, the third balloon 720 may have rotated in a particular direction 728 (or otherwise changed position and/or orientation) such that an optical link from the first balloon 702 may now be established 720. In some examples, it may be preferable for a balloon within the network to communicate using an optical link with a closest balloon if such an optical communication link may be established. For instance, it may be preferable for balloon 702 to use its optical communication system to communicate with the third balloon 720 rather than the second balloon 714.

Figure 7C:
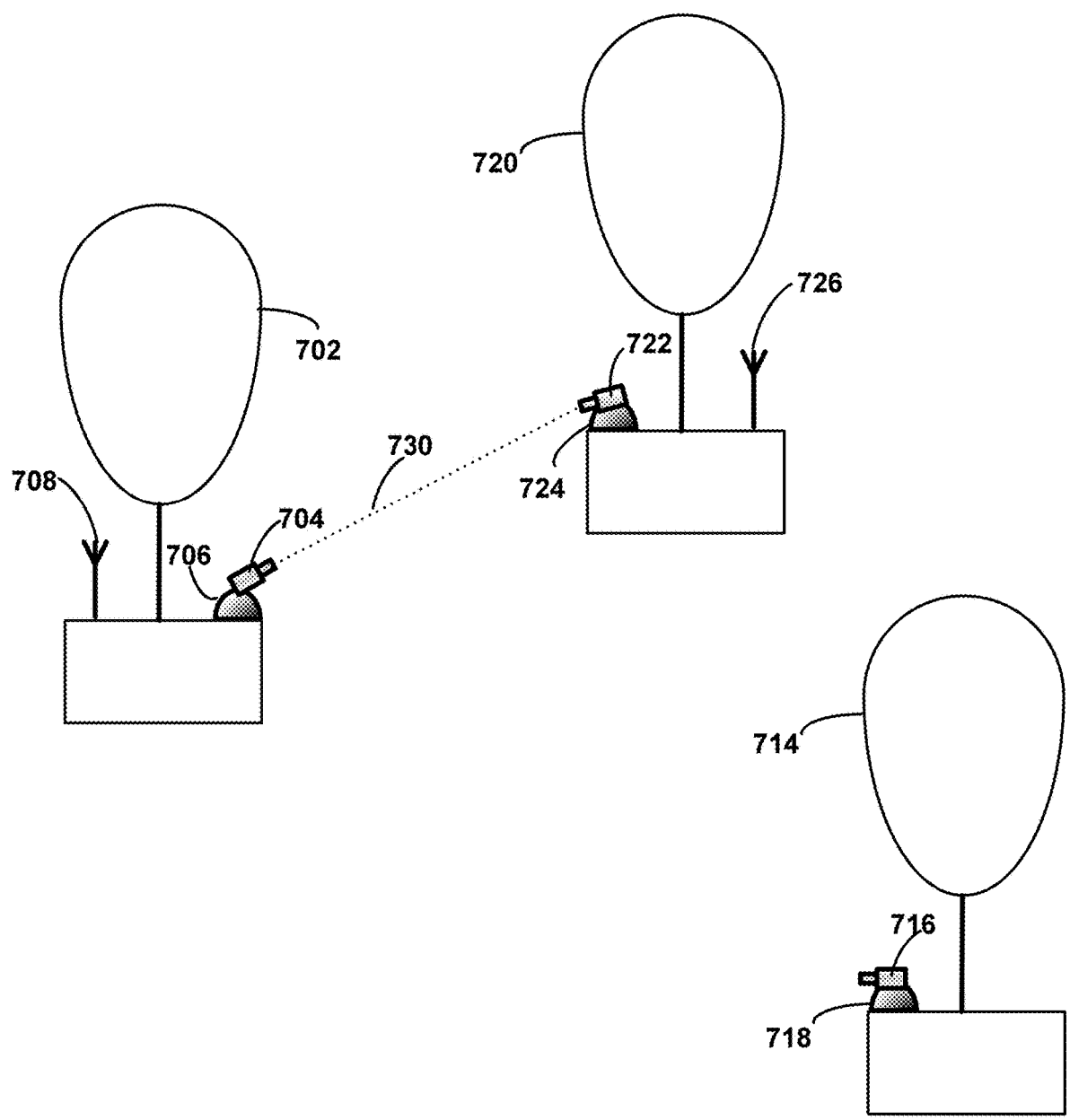
FIG. 7C illustrates establishment of an optical communication link with the third balloon from FIG. 7A, according to an example embodiment.

In such examples, the RF communication system of the first balloon 702 may be used to avoid a discontinuation in service while establishing an optical link with the third balloon 720. FIG. 7C shows an optical link between the first balloon 702 and the third balloon 720, according to an example embodiment. As shown, a transceiver 704 on the first balloon 702 may be realigned from the transceiver 716 on the second balloon 714 to point instead at a transceiver 722 on the third balloon 720. The coordination process to determine an axis 730 for optical communication between the first balloon 702 and the third balloon 720 may take some time. During that time, the RF link between the first balloon 702 and the third balloon 720 may be used so that the first balloon 702 remains connected to the balloon network the entire time.

The examples given in this section are meant for purposes of explanation and are not meant to be limiting. Other types of balloons and/or balloon networks may benefit from the disclosed systems and methods for switching between optical communication links and RF communication link as well, without departing from the spirit or scope of the subject matter presented herein.

IV. Example Methods Involving a Balloon and a Ground-Based Station

Figure 8:
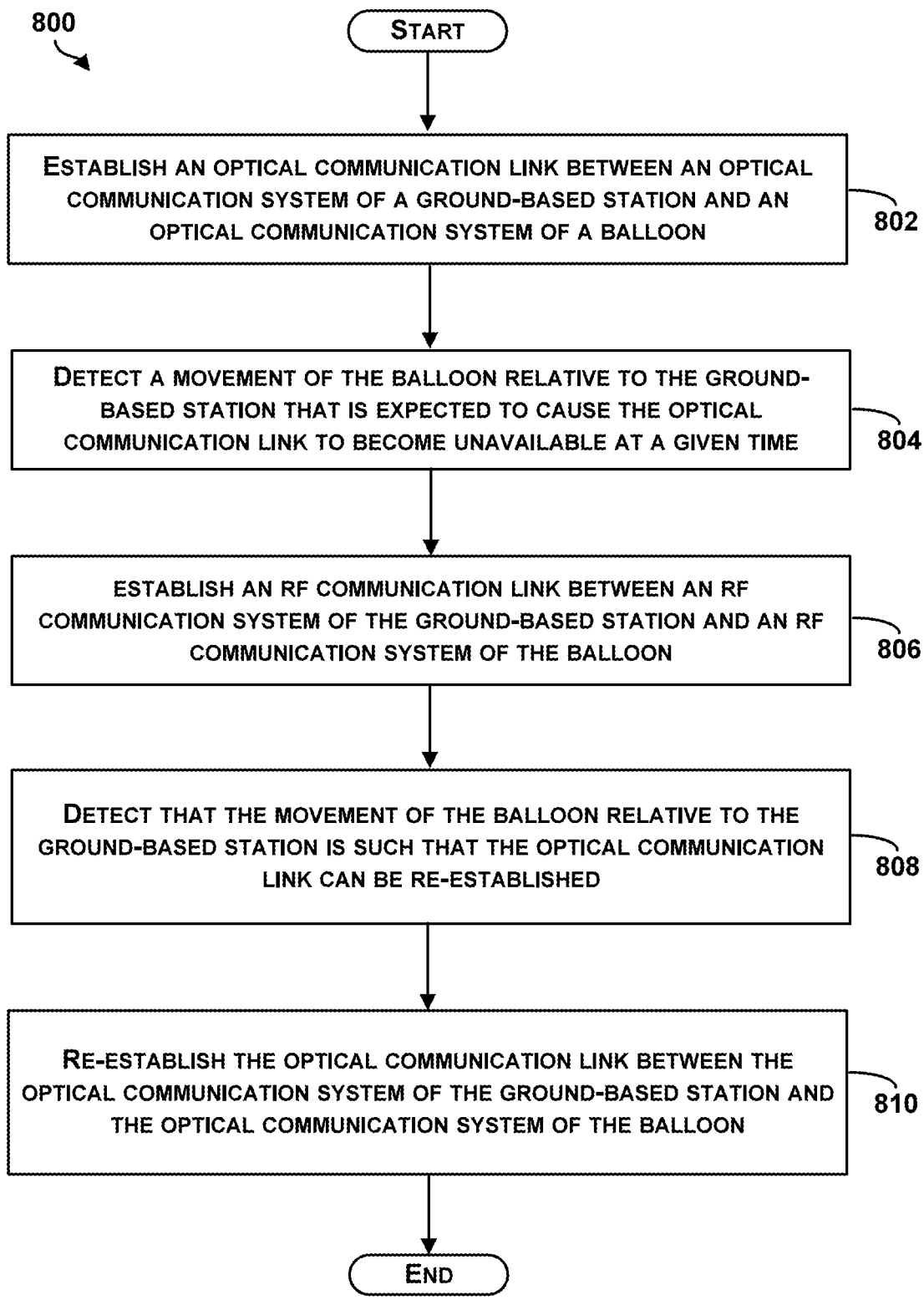
FIG. 8 is a block diagram of another method, according to an example embodiment.

Example methods may also be used for handoffs between a ground-based station and a balloon. FIG. 8 is a block diagram of a method, according to an example embodiment. The method 800 may be carried out by a control system of a balloon network. For example, some or all of method 800 may be carried out by a central control system and/or regional systems such as the ones described above with respect to FIG. 2. The control system(s) may communicate with the balloons within the balloon network. In further examples, all or some of method 800 may be carried out by one or more computing systems located on a ground-based station and/or on individual balloons. In some examples, the parts of the method 800 may be combined, separated into additional parts, and/or carried out in a different order than shown. Other configurations are also possible.

Figure 9A:
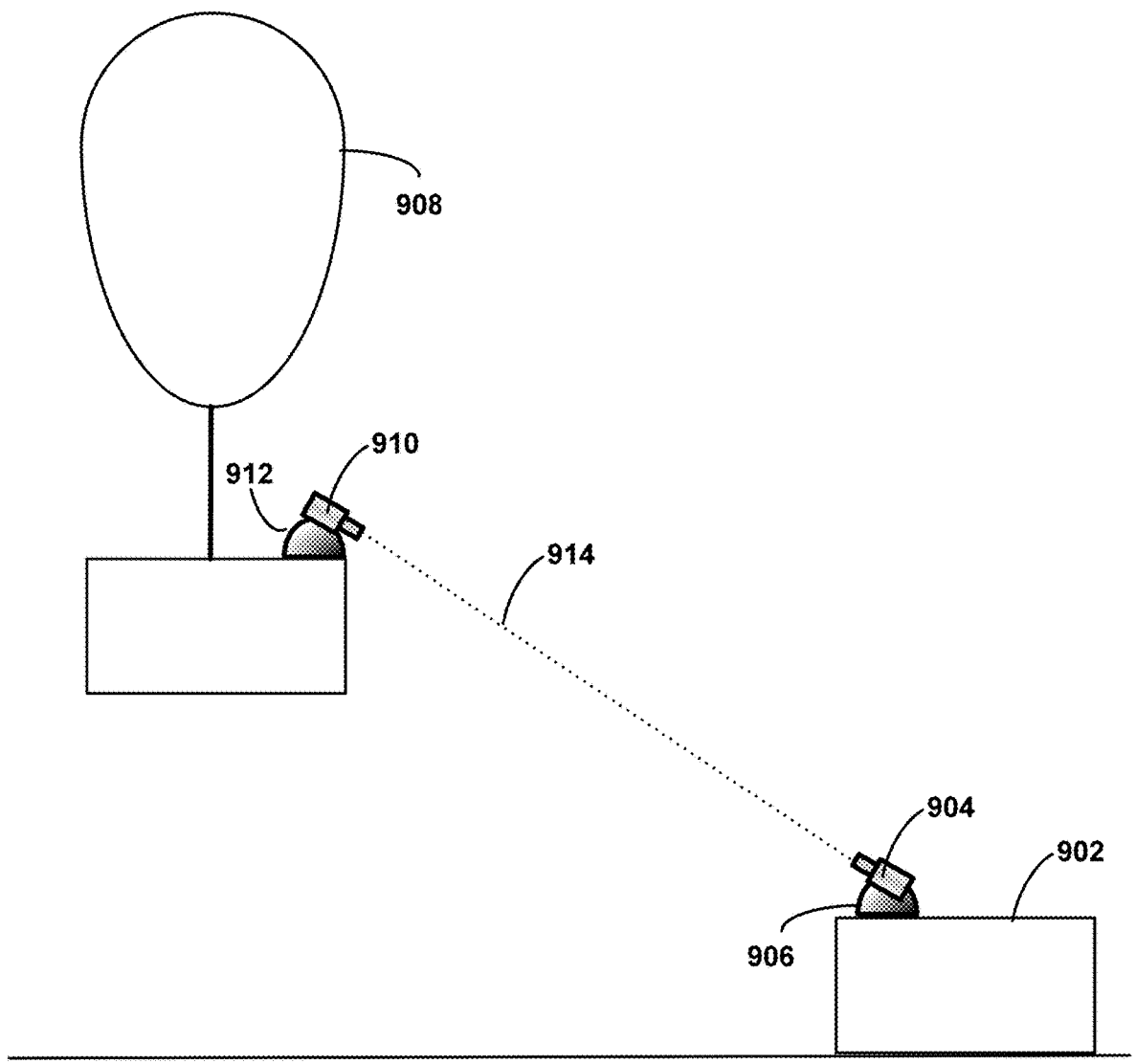
FIG. 9A illustrates an optical communication link between a balloon and a ground-based station, according to an example embodiment.

Method 800 may initially involve establishing an optical communication link between an optical communication system of a ground-based station and optical communication system of a balloon, as shown by block 802. FIG. 9A shows an optical link between a ground-based station and a balloon, according to an example embodiment. As shown, a ground-based station 902 may contain an optical communication system with components such as a transceiver 904 and a gimbal 906 to point the transceiver 904. A balloon 908 may also contain a transceiver 910 and a gimbal 912 to point the transceiver 910. A control system (e.g., a computing system on the station or the balloon or both) may coordinate the transceiver 904 on the station 902 and the transceiver 910 on the balloon 908 so that they point along an axis 914. Once the axis 914 is determined, an optical link may be established and used to communicate between the ground-based station 902 and the balloon 908.

Figure 9B:
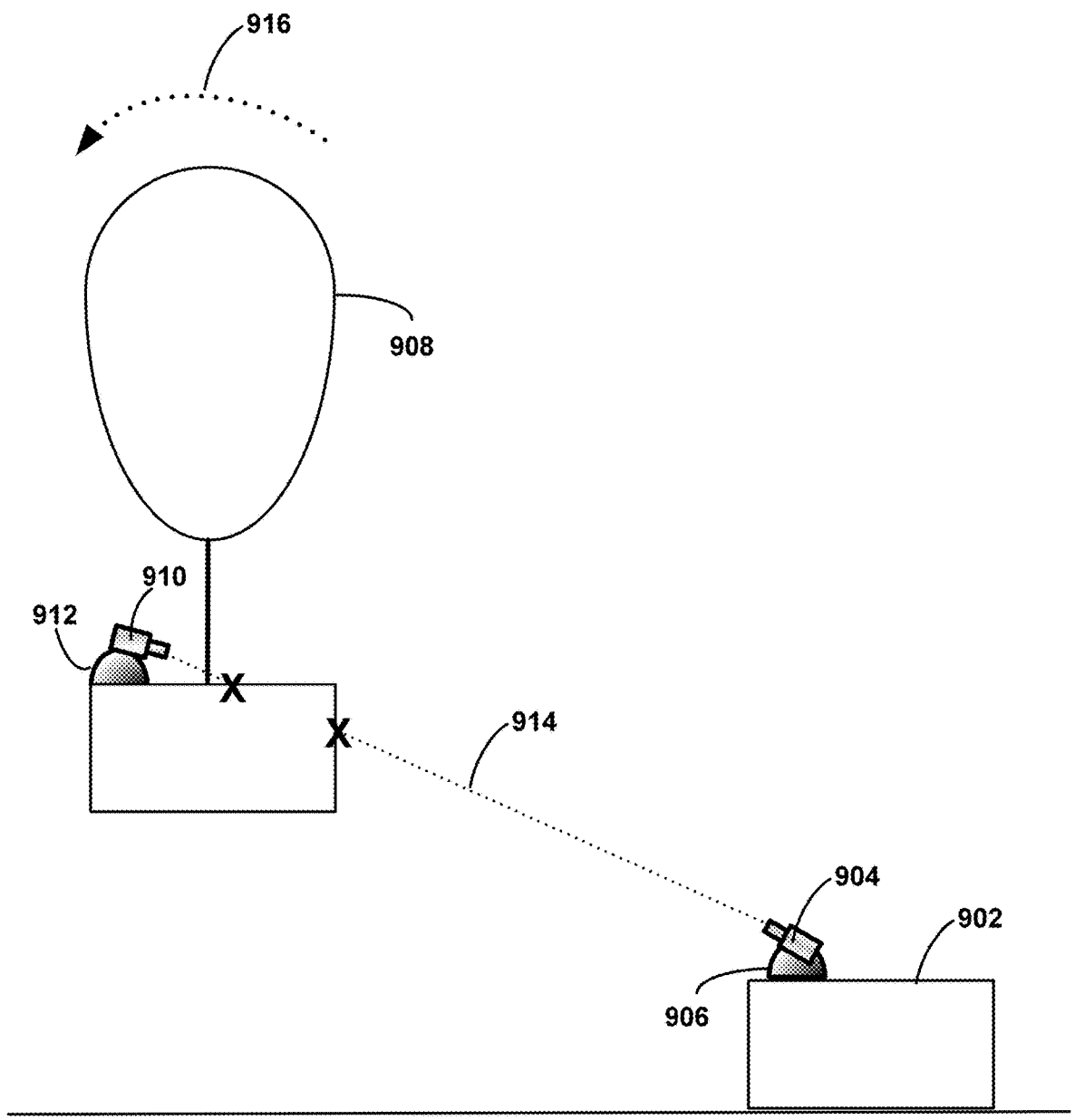
FIG. 9B illustrates a disruption of the optical communication link from FIG. 9A based on a rotation of a balloon, according to an example embodiment.

Method 800 may then involve detecting a movement of the balloon relative to the ground-based station that is expected to cause the optical communication link to become unavailable at a given time, as shown by block 804. FIG. 9B shows a situation where the optical link is unavailable, according to an example embodiment. As shown, the balloon 908 may rotate in a particular direction 916 so that the transceiver 910 on the balloon can no longer be aligned with the transceiver 904 on the station 902. The optical link may become unavailable for other reasons as well, such as when the balloon 908 changes horizontal or vertical position and/or when the level of atmospheric interference changes.

Figure 9C:
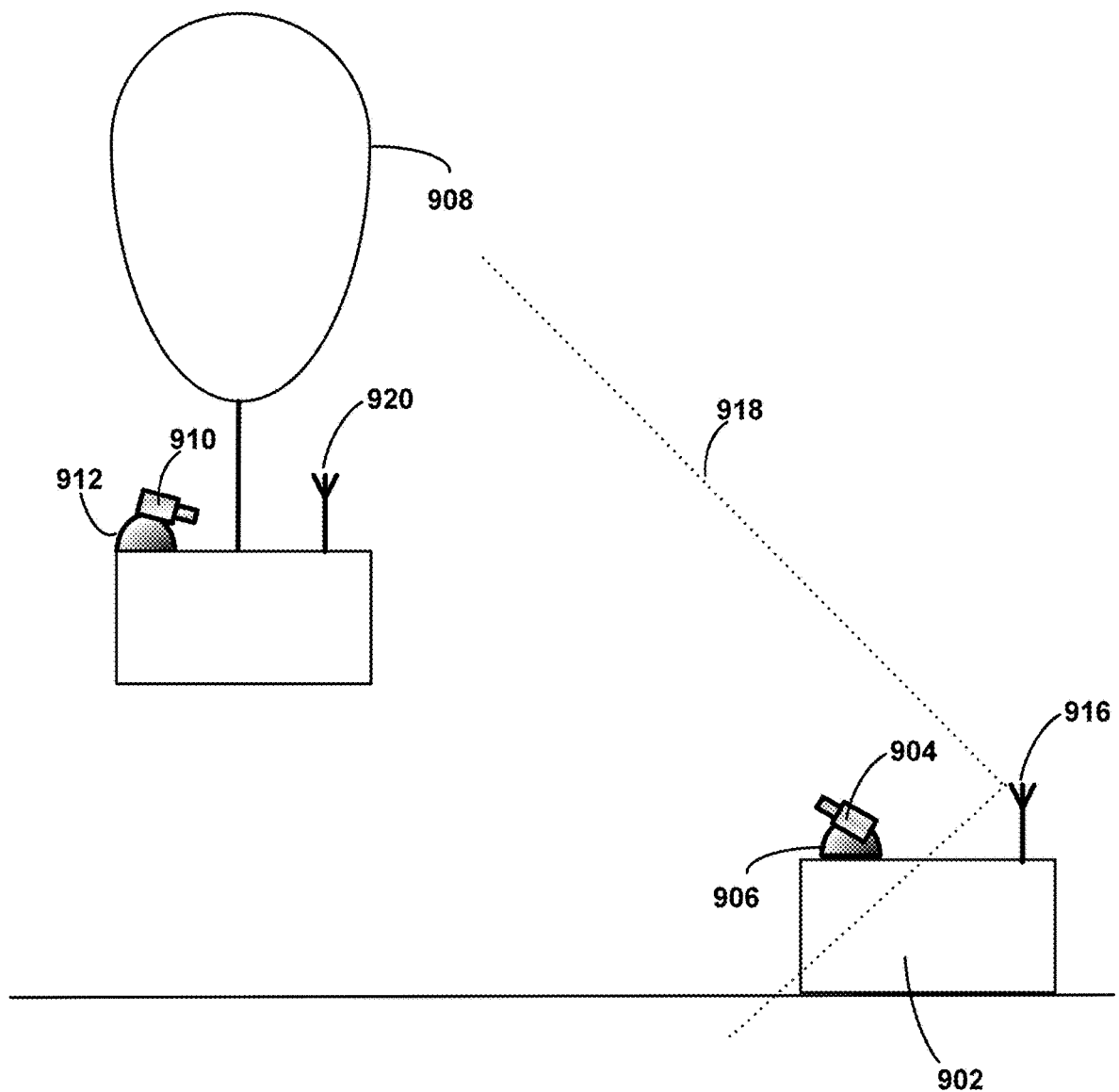
FIG. 9C illustrates an RF communication link between the balloon and the ground-based station from FIG. 9A, according to an example embodiment.

Method 800 may then involve establishing an RF communication link between an RF communication system of the ground-based station and an RF communication system of the balloon, as shown by block 806. The RF link may be established before the balloon has moved such that the optical link becomes unavailable. FIG. 9C shows an RF link between the ground-based station 902 and the balloon 908. As shown, an antenna 916 on the station 902 may be used to send and/or receive signals to an antenna 920 on the balloon 908. Any of the RF systems described above which may be able to reach the balloon 908 when an optical link is unavailable may be used. For instance, the antenna 916 may transmit a beam with a beam width 918 wide enough to reach the antenna 920 on the balloon 908.

Figure 9D:
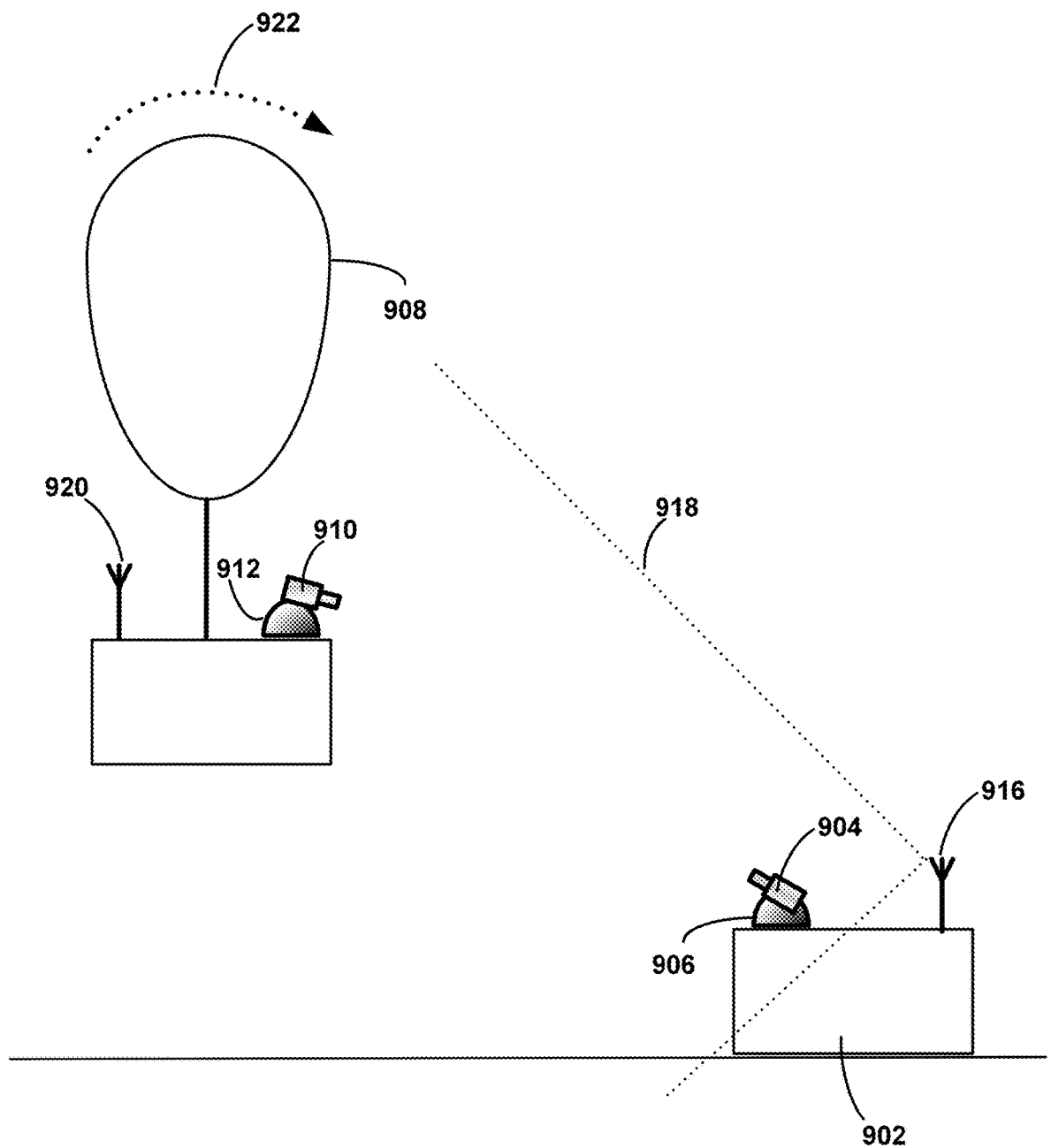
FIG. 9D illustrates a situation where the optical communication link from FIG. 9A can be re-established based on a rotation of a balloon, according to an example embodiment.

Method 800 may then involve detecting that the movement of the balloon relative to the ground-based station is such that the optical communication link can be re-established, as shown by block 808. FIG. 9D shows a situation where the balloon 908 has rotated in a direction 922 such that an optical link can be re-established, according to an example embodiment. In particular, it may now be possible to align the transceiver 904 on the station 902 with the transceiver 910 on the balloon 908. In some examples, a different optical transceiver from the station 902 and/or the balloon 908 may be used than was used for previous optical communication.

Figure 9E:
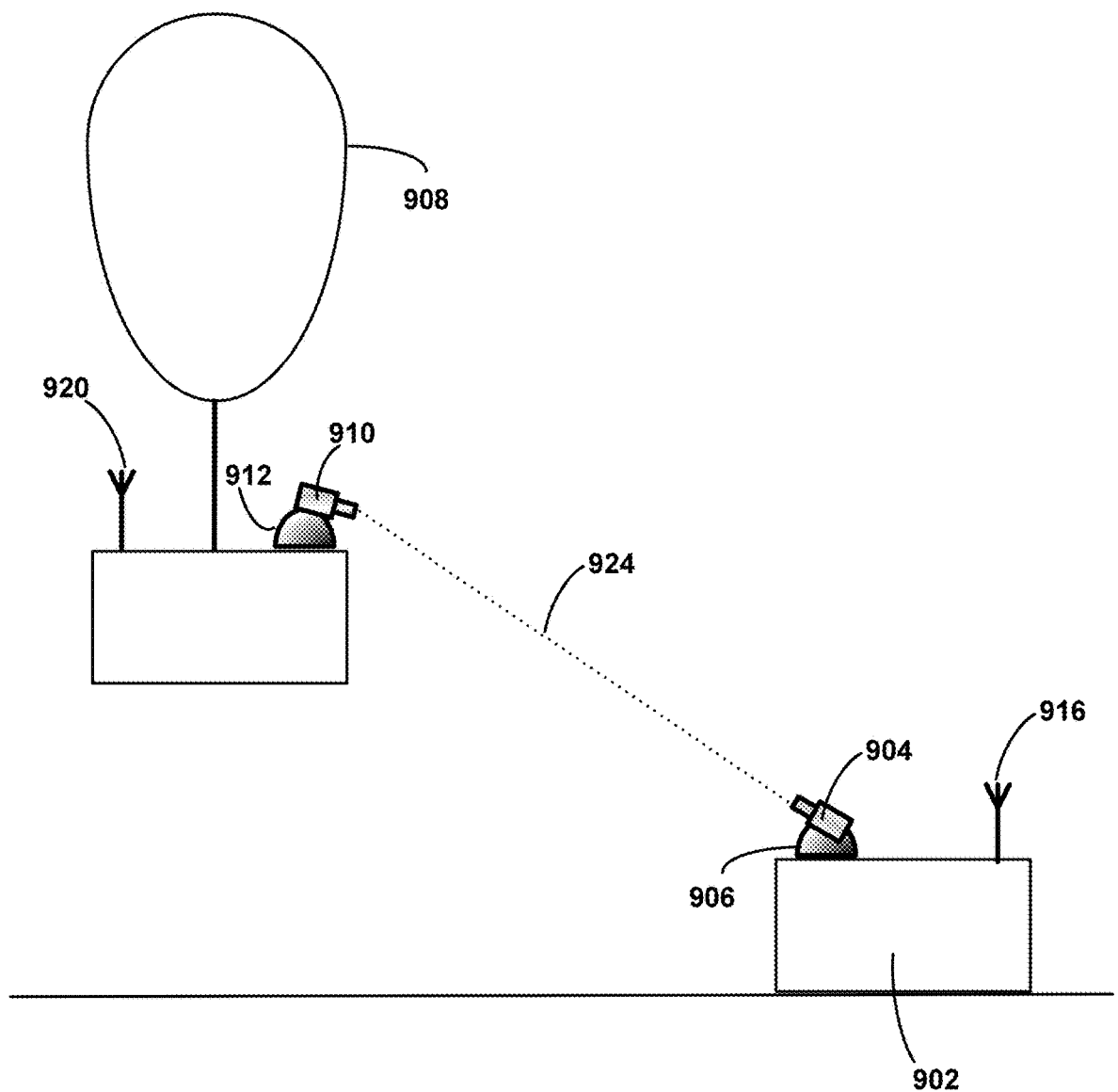
FIG. 9E illustrates re-establishment of the optical communication link from FIG. 9A, according to an example embodiment.

Method 800 may then involve re-establishing the optical communication link between the optical communication system of the ground-based station and the optical communication system of the balloon, as shown by block 810. FIG. 9E shows a re-established optical communication link between the balloon 908 and the station 902, according to an example embodiment. As shown, a new axis 924 may be determined between a transceiver 904 on the station 902 and a transceiver 910 on the balloon so that the optical communication link can be re-established. Once it is established, the station and the balloon may switch from RF communication back to optical communication.

In some examples, a ground-based station may communicate with multiple balloons simultaneously. Example methods may be used to enable the station to handoff between optical and RF communication with multiple balloons at the same time. In some examples, the station may also use RF communication systems to avoid down time while initiating optical communication with new balloons and/or switching optical links from one balloon to another. In further examples, other types of stations, such as space-based satellites, may use example methods to communicate with balloons as well.

V. Conclusion

Further, the above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing, specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

What is claimed is:

1. A communication method, comprising:
  establishing a first communication link between a communication system of a first lighter-than-air vehicle configured to operate in the stratosphere and a communication system of a second lighter-than-air vehicle configured to operate in the stratosphere;
  detecting movement of the second lighter-than-air vehicle relative to the first lighter-than-air vehicle;
  determining, by one or more processors, that the detected movement of the second lighter-than-air vehicle relative to the first lighter-than-air vehicle is predicted to cause the first communication link to become unavailable at a given future time;
  in response to determining that the detected movement of the second lighter-than-air vehicle is predicted to cause the first communication link to become unavailable at the given future time, establishing a second communication link between the communication system of the first lighter-than-air vehicle and the communication system of the second lighter-than-air vehicle prior to the given future time;

after establishing the second communication link, determining by the one or more processors that the first communication link can be re-established; and re-establishing the first communication link based on the determination that the first communication link can be re-established, wherein establishing the second communication link between the communication system of the first lighter-than-air vehicle and the communication system of the second lighter-than-air vehicle before the given future time includes establishing the second communication link with a chosen time buffer before the given future time.

2. The method of claim 1, wherein the movement of the second lighter-than-air vehicle relative to the first lighter-than-air vehicle includes a rotational movement.

3. The method of claim 1, wherein the movement of the second lighter-than-air vehicle relative to the first lighter-than-air vehicle includes at least one of a change in altitude or a change in lateral position.

4. The method of claim 1, wherein at least one of the first communication link and the second communication link is a radio frequency link.

5. The method of claim 1, further comprising disabling the second communication link after re-establishing the first communication link.

6. The method of claim 1, wherein re-establishing the first communication link includes aligning a directional transceiver of the communication system of the first lighter-than-air vehicle with a directional transceiver of the communication system of the second lighter-than-air vehicle.

7. The method of claim 1, wherein:
the communication system of the first lighter-than-air vehicle comprises a plurality of directional transceivers;
the first communication link is established using a first directional transceiver of the communication system of the first lighter-than-air vehicle; and
the first communication link is re-established using a second directional transceiver of the communication system of the first lighter-than-air vehicle.

8. The method of claim 1, wherein:
the communication system of the first lighter-than-air vehicle includes a plurality of sectors;
the first communication link is established using a first one of the plurality of sectors of the communication system of the first lighter-than-air vehicle; and
the first communication link is re-established using a second one of the plurality of sectors of the communication system of the first lighter-than-air vehicle.

9. The method of claim 1, wherein the movement of the second lighter-than-air vehicle relative to the first lighter-than-air vehicle is in accordance with a control system to achieve a particular objective within a balloon network.

10. The method of claim 9, wherein the particular objective is a coverage objective over one or more areas on the ground.

11. The method of claim 1, wherein determining that the detected movement is predicted to cause the first communication link to become unavailable at the given future time includes evaluating a mechanical limitation of a component of the communication system of the first lighter-than-air vehicle.

* * * * *